United States Patent
Nakagawa et al.

(10) Patent No.: US 6,730,905 B2
(45) Date of Patent: May 4, 2004

(54) SCANNING PROBE MICROSCOPY, METHOD OF PRODUCING THE PROBE, AND MOLECULAR PROCESSING METHOD USING THE SCANNING PROBE MICROSCOPE

(75) Inventors: Tohru Nakagawa, Kusatsu (JP); Tetsuo Yukimasa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/130,569

(22) PCT Filed: Sep. 20, 2001

(86) PCT No.: PCT/JP01/08217
§ 371 (c)(1),
(2), (4) Date: May 17, 2002

(87) PCT Pub. No.: WO02/25246
PCT Pub. Date: Mar. 28, 2002

(65) Prior Publication Data
US 2002/0171038 A1 Nov. 21, 2002

(30) Foreign Application Priority Data
Sep. 21, 2000 (JP) ........................... 2000-286711

(51) Int. Cl.$^7$ ............. H01J 37/26; G01B 5/28; G01N 33/50
(52) U.S. Cl. ............ 250/306; 250/307; 250/423 F; 436/501; 436/518; 436/524; 436/525; 436/527; 436/531; 436/532; 435/6; 435/7.1; 435/291; 73/105
(58) Field of Search ............. 250/306, 307, 250/4.23 F; 435/6, 7.1, 291; 73/105; 422/50, 68.1; 436/501, 518, 524, 525, 527, 531, 532

(56) References Cited

U.S. PATENT DOCUMENTS

| | | | |
|---|---|---|---|
| 5,353,632 A | | 10/1994 | Nakagawa |
| 5,363,697 A | * | 11/1994 | Nakagawa ............... 73/105 |
| 5,372,930 A | | 12/1994 | Colton et al. |
| 5,730,940 A | * | 3/1998 | Nakagawa ............ 422/68.1 |
| 5,763,768 A | | 6/1998 | Henderson et al. |
| 6,096,497 A | * | 8/2000 | Bauer ..................... 435/4 |
| 6,649,350 B2 | * | 11/2003 | Barton et al. ............. 435/6 |
| 2002/0127491 A1 | * | 9/2002 | Weiss et al. ............ 430/296 |
| 2002/0171038 A1 | * | 11/2002 | Nakagawa et al. ...... 250/306 |

FOREIGN PATENT DOCUMENTS

| | | |
|---|---|---|
| EP | 0 511 662 A1 | 11/1992 |
| EP | 0 583 894 A2 | 2/1994 |
| GB | 2 235 049 A | 2/1991 |
| JP | 9-5338 | 1/1997 |

* cited by examiner

Primary Examiner—John R. Lee
Assistant Examiner—Bernard Souw
(74) Attorney, Agent, or Firm—Snell & Wilmer, LLP

(57) ABSTRACT

There is provided a probe for a scanning probe microscope, comprising: a proximal end; and a distal tip portion, wherein the distal tip portion has a tip surface which faces a fixed sample, and at least one monolayer is formed at least on the tip surface, and a molecule having a chemical sensor function or catalytic function is placed in or on an outermost monolayer above the tip surface. There is provided a probe for a scanning probe microscope, comprising: a cover layer containing an electrically conductive polymer; and a catalyst in the cover layer, the catalyst being selected from a group consisting of inorganic catalysts and organic catalysts. There are provided a scanning probe microscope equipped with the above probe, and a molecule processing method using such a scanning probe microscope.

18 Claims, 14 Drawing Sheets

(A)

(B)

(A)

(B)

SCANNING PROBE MICROSCOPY, METHOD OF PRODUCING THE PROBE, AND MOLECULAR PROCESSING METHOD USING THE SCANNING PROBE MICROSCOPE

TECHNICAL FIELD

The present invention relates to a probe for use in an "intermolecular force microscope" which analyzes/processes a surface of a solid substance by utilizing a chemical reaction, and a production method of such a probe. The present invention further relates to a scanning probe microscope incorporating such a probe, and a molecule processing method using such a scanning probe microscope.

BACKGROUND ART

A measurement apparatus called a "scanning probe microscope" examines information over a surface of a solid substance by scanning a predetermined range of the surface of the solid substance with a sharp-tip probe placed in the close vicinity of the surface of the solid substance at the accuracy of angstroms, and measuring an interaction caused between the probe and the surface of the solid substance during the scanning operation. There are various scanning probe microscope proposed in accordance with the type of interaction to be measured. For example, when the interaction is a tunneling current, a scanning tunneling microscope is employed; when the interaction is interatomic force, an atomic force microscope is employed; and when the interaction is magnetic force, a magnetic force microscope is employed.

There are proposed "intermolecular force microscopes", where a molecule having a chemical sensor function, or a molecule of a catalyst, is fixed at the tip of a probe of a scanning probe microscope, and a chemical interaction or catalysis caused between the molecule at the tip of the probe and the molecule to be measured is utilized to examine or process chemical information of the molecule to be measured (Japanese Patent No. 2653597; Japanese Patent No. 2561396; Nakagawa, "Shokubai (catalyst)", Vol 39, pp. 628–635, 1997). The principle of an intermolecular force microscope composed by fixing a sensor molecule to a probe of an atomic force microscope is described below. Herein, a "chemical sensor function" refers to a function of analyzing a chemical characteristic of an organic molecule. In general, a chemical characteristic of a molecule is determined by the three-dimensional structure of the molecule or a functional group included in the molecule. A sensor molecule having a chemical sensor function can specifically examine such a structure or functional group.

FIG. 11 illustrates the principle of an atomic force microscope. A sample 153 is fixed on a piezoelectric element 154 extendable in X-, Y-, and Z-directions. A probe 114, which includes a tip having the radius of curvature of several tens of nanometers, is present above the sample 153. The probe 114 is fixed at the tip of a lever portion 152. When force is applied between the sample 153 and the probe 114, the lever portion 152 is deflected. This deflection can be evaluated by measuring with two photodiodes 155 the variation in the reflection angle of a laser beam 151 reflected by the lever portion 152. Therefore, force caused between the sample and the probe can be calculated from the product of the amount of deflection and the spring constant of the lever portion. Thus, force caused between the sample and the probe is measured while scanning a specific region of the sample on an X-Y plane with the piezoelectric element, whereby information on the surface of the sample can be examined.

For example, an X-Y region is scanned while applying feedback to the movement of the piezoelectric element in the Z-direction such that force caused between the sample and the probe is maintained to be constant, whereby the relationship of the movement of the piezoelectric element in the X-, Y-, and Z-directions is examined. Through such an examination, concaves/convexes of the sample can be evaluated. Herein, a sensor molecule is fixed to the tip of the probe for measuring a surface of a base material on which other types of molecules are present, so that the position of a specific molecule can be examined. That is, in the case where the sensor molecule is a molecule that causes strong attractive force only with a molecule (molecule A), the position of molecule A can be examined at a resolution of a molecular level by measuring the surface of the base substance on which the other types of molecules are present, with a probe having such a sensor molecule. Further, if a catalyst molecule is fixed to the probe, a specific molecule can be processed with such a probe.

A base sequence of a DNA can also be determined by using an intermolecular force microscope. In the case where adenine, which constitutes a DNA, is fixed to a probe, and a single stranded DNA fixed on the base material is measured, the position of thymine can be specified because adenine causes large attractive force with thymine in a DNA. The base sequence in the DNA can be examined by conducting a measurement in a similar manner using probes having thymine, guanine, and cytosine attached thereto.

In a conventional intermolecular microscope, a molecule is fixed to a probe such that the molecule covers an entire surface of the probe. Thus, without correct control of the distance between the probe and a sample, a large number of molecules on the probe come into contact with the molecule to be examined during an examination process, so that the measurement resolution is poor. Similarly, also in molecular processing using an intermolecular force microscope, it is difficult to process only a single molecule because a large number of molecules fixed on the probe cause interaction with the large number of molecules to be processed. Hereinafter, problems involved in conventional intermolecular force microscope are described in detail.

FIG. 12 diagrammatically illustrates an example where the position of molecule A 163, which is fixed on a surface of a solid substance, is examined using an intermolecular force microscope. When a probe is pressed against the surface of the solid substance, the surface of the solid substance is elastically deformed, so that two neighboring molecules, molecule A 163 and molecule B 164, cause an interaction, and as a result, the positions of these two molecules cannot be identified.

FIG. 13 is a conceptual diagram which illustrates an example of determining the position of adenine 174, which is a base included in a single stranded DNA 173, by using an intermolecular force microscope. Thymine 172, which causes a specific interaction with adenine, is fixed to a probe 171. In principle, the position of adenine 174 in a DNA can be examined by examining the position of adenine which causes an interaction with thymine 172 on the probe. However, if the probe 171 is too close to the sample, two or more thymine molecules 172 are specifically interacted with two or more adenine molecules 174 of the DNA strand 173. As a result, it becomes difficult to identify the position of adenine in the DNA strand 173.

FIG. 14 illustrates an example where a protein thin film fixed onto a base material is processed using an intermolecular force microscope. Peptidases, which are enzymes for decomposing a protein, are fixed to a probe 181. In this case, if force caused between the probe and a sample is too large, a large number of peptidases come into contact with the protein thin film. As a result, it becomes difficult to process the protein to a precision of a single molecule size.

It is readily appreciated that the above problems can be solved by fixing a sensor molecule or a catalyst onto a probe having the radius of curvature of angstroms. A proposed candidate for a probe having the smallest radius of curvature is a carbon nanotube. In recent years, there has been proposed a method for fixing a carbon nanotube to a probe of an AFM (atomic force microscope) and fixing an organic molecule to the carbon nanotube (D. Hongjie, et al., Nature; vol. 384, p.147, 1996). However, even a carbon nanotube has a radius of curvature of 2.6 nm at the tip thereof, and accordingly, the number of molecules formed in the region (tip surface) at the tip of the probe which faces a sample is about several hundreds. Thus, similarly as described above, a large number of molecules on a probe causes interactions with molecules of a sample without providing strict control of force between the probe and the sample.

DISCLOSURE OF THE INVENTION

The present invention relates to a probe for a scanning probe microscope. This probe includes: a proximal end; and a distal tip portion, wherein the distal tip portion has a tip surface which faces a fixed sample, and at least one monolayer is formed at least on the tip surface, and a molecule having a chemical sensor function or catalytic function is placed in or on an outermost monolayer above the tip surface.

Preferably, stacked monolayers are formed over the tip surface; and the molecular density in respective layers of the stacked monolayers decreasingly varies from the tip surface to the outermost layer.

Preferably, the at least one monolayer is formed by use of a covalent bond.

Preferably, the at least one monolayer is formed of an organic molecule; and the number of molecules included in an outermost monolayer above the tip surface is equal to or smaller than 100.

Preferably, the probe of the present invention includes stacked monolayers; a plurality of molecules having a chemical sensor function or catalytic function are provided in different monolayers; and the plurality of molecules have different chemical sensor functions or catalytic functions.

According to one aspect of the present invention, the present invention relates to a probe for a scanning probe microscope, which includes: a cover layer containing an electrically conductive polymer; and a catalyst in the cover layer, the catalyst being selected from a group consisting of inorganic catalysts and organic catalysts.

Preferably, a probe of the present invention further includes at least one organic molecular film formed on the cover layer, wherein a molecule having a chemical sensor function or catalytic function is placed in or on an outermost organic molecular layer.

Preferably, a function of the catalyst contained in the cover layer is different from a function of the molecule having the chemical sensor function or catalytic function.

According to one aspect of the present invention, the present invention relates to a method for producing the probe for a scanning probe microscope. This method includes steps of: (a) forming a monolayer on a probe; and (b) forming another monolayer on the monolayer, or modifying a molecular structure of a molecule included in the monolayer.

Preferably, the step (b) includes: substituting a molecule end of a molecule included in the monolayer with a functional group by means of a chemical reaction performed at a substitution efficiency of smaller than 1; and bonding the functional group to a molecule which is capable of being bonded to the functional group.

Preferably, the monolayer is formed of an organic molecule; and the step (b) includes bringing the distal tip portion of the probe into contact with a surface of a solid substance having a catalytic function, so that only the organic molecule at a tip surface of the distal tip portion of the probe is reactively modified.

Preferably, the monolayer is formed of an organic molecule: and the step (b) includes scanning with the probe a surface of a solid substance including at least one region which has a catalytic function, and reactively modifying only the organic molecule at the tip surface of the distal tip portion of the probe.

Preferably, the monolayer is formed of an organic molecule; when the organic molecule comes into contact with a solid catalyst in the presence of a substrate, a molecular structure of the organic molecule is modified by a chemical reaction; and the step (b) includes repeating reciprocation of the probe by moving the probe toward, and away from, a surface of the solid catalyst in the absence of the substrate, thereby adjusting an approach distance between the probe and the solid catalyst, and thereafter positioning the probe and the solid catalyst with the approach distance therebetween in the presence of the substrate, thereby modifying a molecular structure of the organic molecule.

Preferably, the above method may further include a step of bonding an organic molecule having a chemical sensor function or catalytic function to the modified organic molecule.

According to one aspect of the present invention, the present invention relates to a method for producing the probe for a scanning probe microscope. This method includes steps of: immersing a probe in a solution containing an electrochemically-polymerizable monomer; and applying a voltage to the probe so as to polymerize the monomer, thereby forming a cover layer.

Preferably, the monomer solution includes a catalyst molecule.

Preferably, the above method further includes steps of: immersing a probe having the cover layer in a solution or dispersion solution containing a catalyst molecule; and applying a voltage to the probe, thereby uptaking the catalyst molecule in the cover layer.

According to one aspect of the present invention, the present invention relates to a method for processing an intended molecule using a scanning probe microscope having a probe. This probe has a cover layer containing an electrically conductive polymer, and a catalyst molecule being uptaken in the cover layer. This method includes steps of: moving the probe closer to the intended molecule; and applying a voltage to the electrically conductive polymer so as to release the catalyst molecule to the intended molecule, thereby causing a chemical reaction.

The present invention also relates to a scanning probe microscope which includes: the above probe; means for controlling relative positions of the probe and the sample; and means for detecting an interaction between the probe and the sample.

BEST MODE FOR CARRYING OUT THE INVENTION

As a probe of a scanning probe microscope of the present invention, a probe of an atomic force microscope, a probe of a scanning tunneling microscope, a probe of a magnetic force microscope, a probe of a scanning electrochemical microscope, or the like, may be used. Most usually, a probe of an atomic force microscope is used. This probe can be formed by a photolithography method, and silicon or silicon nitride is frequently used as a material thereof. Further, the radius of curvature of the tip of the probe is about 20–30 nm. Furthermore, a carbon nanotube or whisker may be used as a probe. In such a case, the carbon nanotube or whisker is fixed with an epoxy resin to a probe made of silicon or silicon nitride produced using a photolithography method.

Embodiment 1

Figure 1:
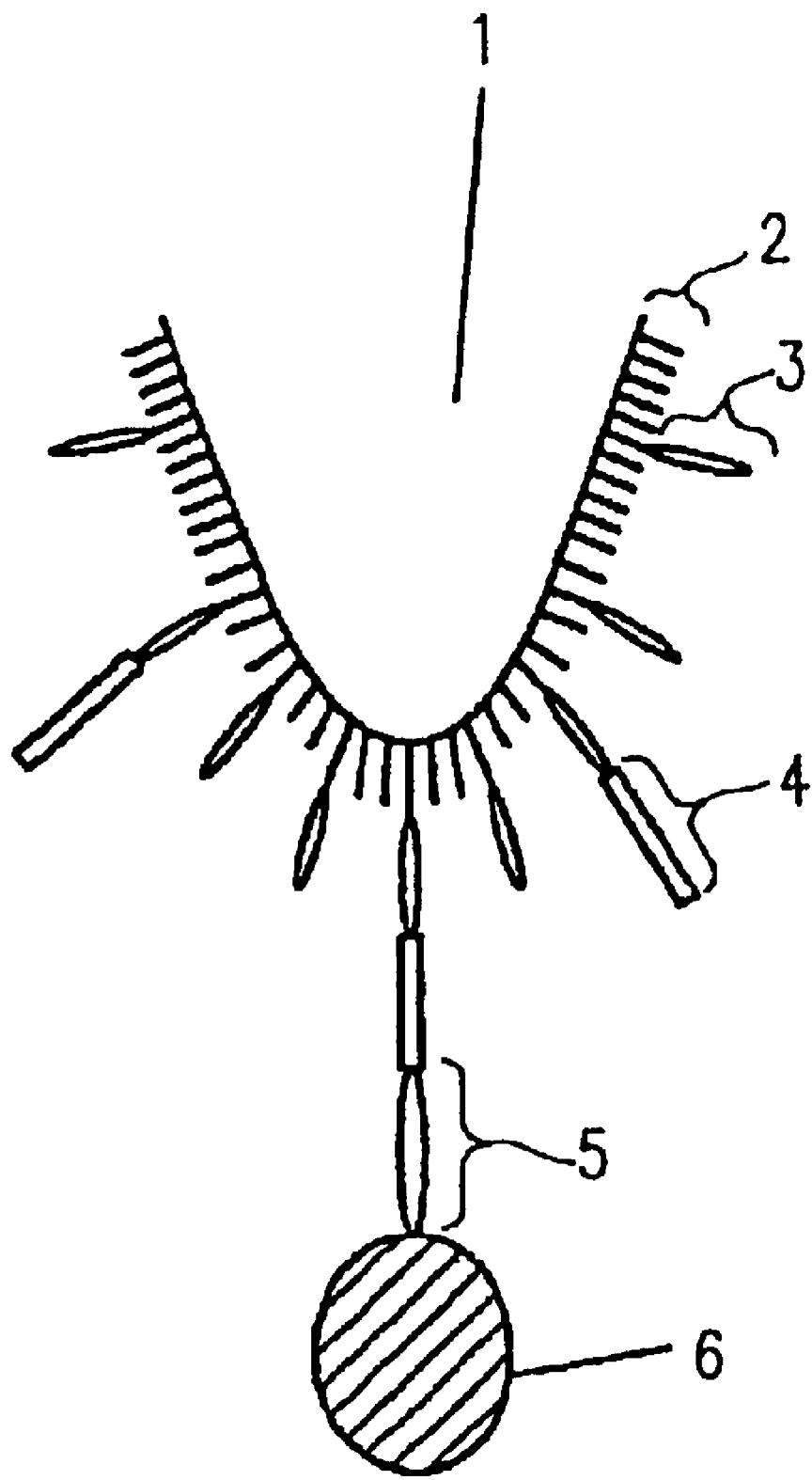
FIG. 1 is a general schematic view of a probe of a scanning probe microscope of the present invention. Reference numerals in FIG. 1 denote the following elements: 1: a probe of a scanning probe microscope; 2: a first monolayer; 3: a second monolayer; 4: a third monolayer; 5: a fourth monolayer; 6: a molecule having a sensor function or catalyst function.

A probe of a scanning probe microscope according to embodiment 1 of the present invention is shown in FIG. 1. On a probe 1, a layered structure including two or more monolayers 1, 2, 3, 4, and 5 is formed. The term used in this specification, "monolayer", refers to a layer of specific molecules formed on an interface so as to be one molecule in thickness. Typical examples of the monolayer include a monomolecular film. As shown in FIG. 1, the density of molecules included in the layered monolayers decreasingly varies from the surface of the probe to the outer layer. As a result, the number of molecules included in the outermost monolayer at the tip of the probe can be suppressed to the minimum number. Sensor molecules or catalyst molecules are employed as molecules 6 in the outermost monolayer on the probe, whereby in principle the chemical structure of a single molecule can be measured or processed. Also when molecules having a chemical sensor function or catalytic function are employed in the outermost monolayer, the same function can be given to the probe. Furthermore, if molecules are covalently bonded between the probe and a monolayer thereon, and between adjacent monolayers among the layered monolayers, the monolayers do not fall off from the probe during a measurement operation or processing operation. Thus, the probe can be repeatedly used.

Embodiment 2

Figure 2:
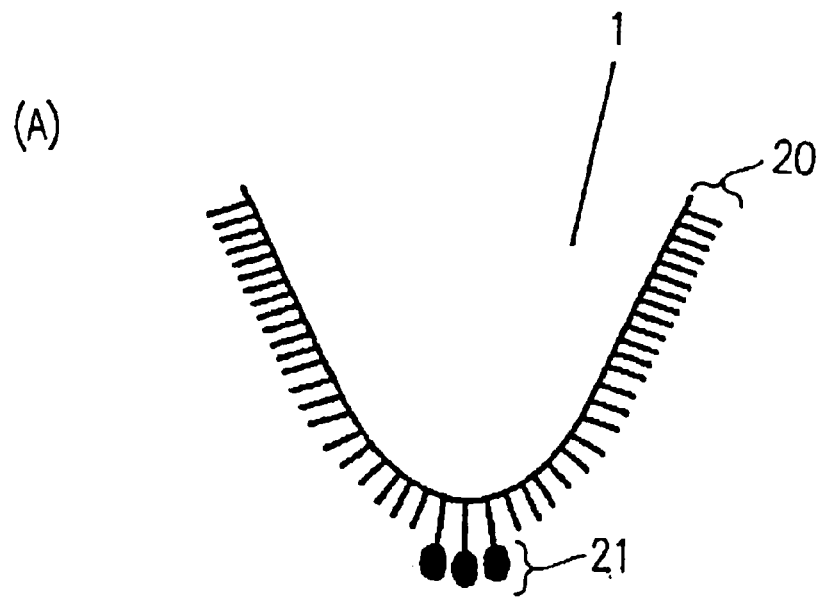
FIG. 2 is a general schematic view of a probe of a scanning probe microscope of the present invention. Reference numerals in FIG. 2 denote the following elements: 1: a probe of a scanning probe microscope; 20: a monolayer; 21, 21': monolayers at a tip portion of the probe.
Figure 2:
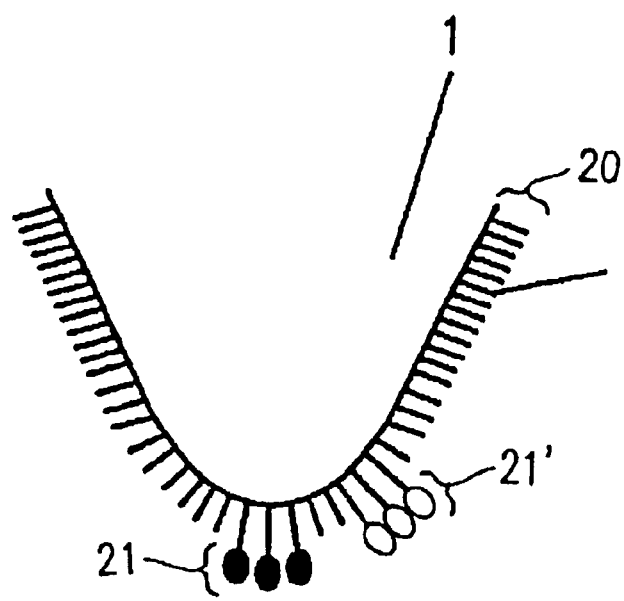

A probe of a scanning probe microscope according to embodiment 2 of the present invention is shown in FIG. 2. Referring to section (A) of FIG. 2, an organic monolayer 20 is formed over the surface of the probe 1. A monolayer including 100 or fewer molecules in an area (tip surface) at the tip portion of the probe which comes into contact with a sample has a chemical sensor function or catalytic function. Thus, in principle, the chemical structure of a single molecule in the sample can be measured or processed. The terms used in this specification, "tip surface" and "probe tip surface", refer to a region of the probe which comes into contact with a sample at the tip of the probe. Also when molecules having a chemical sensor function or catalytic function are employed in the outermost monolayer, the same function can be given to the probe. Furthermore, if molecules are covalently bonded between the probe and a monolayer thereon, and between adjacent monolayers among the layered monolayers, the monolayers do not fall off from the probe during a measurement operation or processing operation. Thus, the probe can be repeatedly used.

Section (B) of FIG. 2 schematically shows an example where a monolayer is formed of two or more types of molecules having different chemical sensor functions or catalytic functions (21, 21') above a probe tip surface. When two or more types of molecules having different chemical sensor functions or catalytic functions are bonded to a monolayer over the probe tip surface, the same function(s) as that described in conjunction with section (A) of FIG. 2 can be given to the probe. In such a probe, the respective types of functional molecules have different chemical sensor functions or catalytic functions. Different operations can be simultaneously performed through a single process of scanning a sample with the probe.

Embodiment 3

Figure 3:
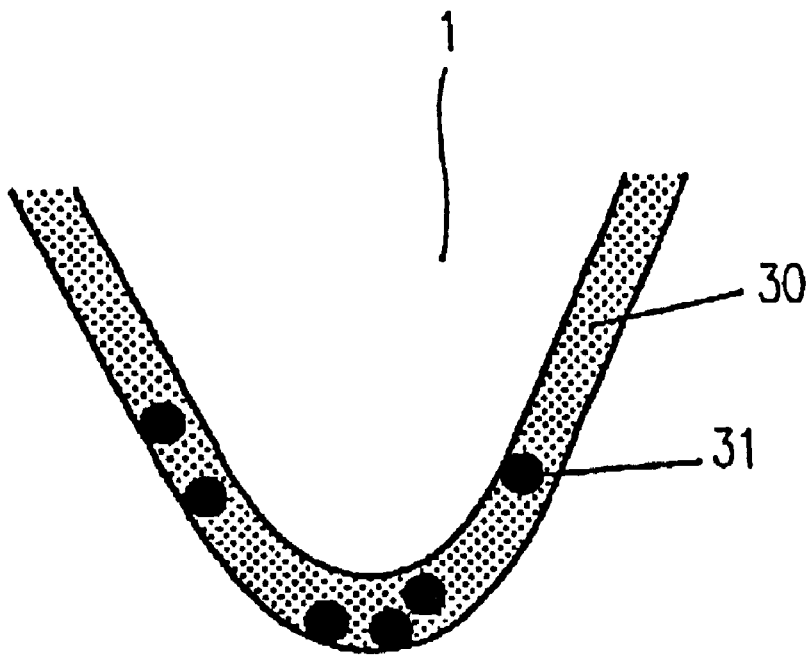
FIG. 3 is a general schematic view of a probe of a scanning probe microscope of the present invention. Reference numerals in FIG. 3 denote the following elements: 1: a probe of a scanning probe microscope; 30: electrically conductive polymer; 31: a catalyst confined in the electrically conductive polymer; 32: an organic molecular film; 33: a molecule having a sensor function or catalyst function.
Figure 3:
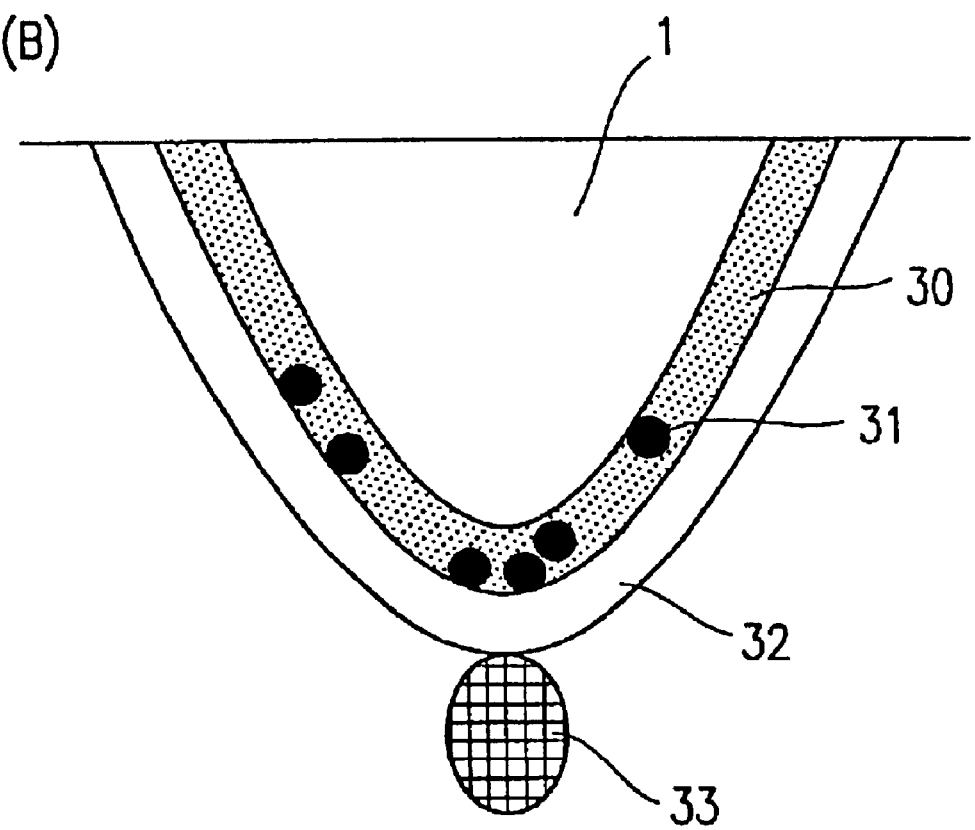

A probe of a scanning probe microscope according to embodiment 3 of the present invention is shown in FIG. 3. Referring to section (A) of FIG. 3, the probe of embodiment 3 is characterized in that a surface of the probe is covered with an electrically conductive polymer 30, and a catalyst 31 selected from among inorganic and organic catalysts is included in the polymer. Section (B) of FIG. 3 shows an example where at least one organic molecule film 32 is formed over a cover layer containing an electrically conductive polymer 30, and a molecule having a chemical sensor function or catalytic function is provided on an outermost organic molecule film above a tip surface of the probe. In the example shown in section (B) of FIG. 3, a functional molecule 33 is bonded to an organic molecule film 32. Since the catalyst 31 contained in the electrically conductive polymer 30 and the functional molecule 33 provided on the outermost organic molecule film above the tip surface of the probe have different functions, different operations can be simultaneously performed through a single process of scanning a sample with the probe.

Embodiment 4

Figure 4:
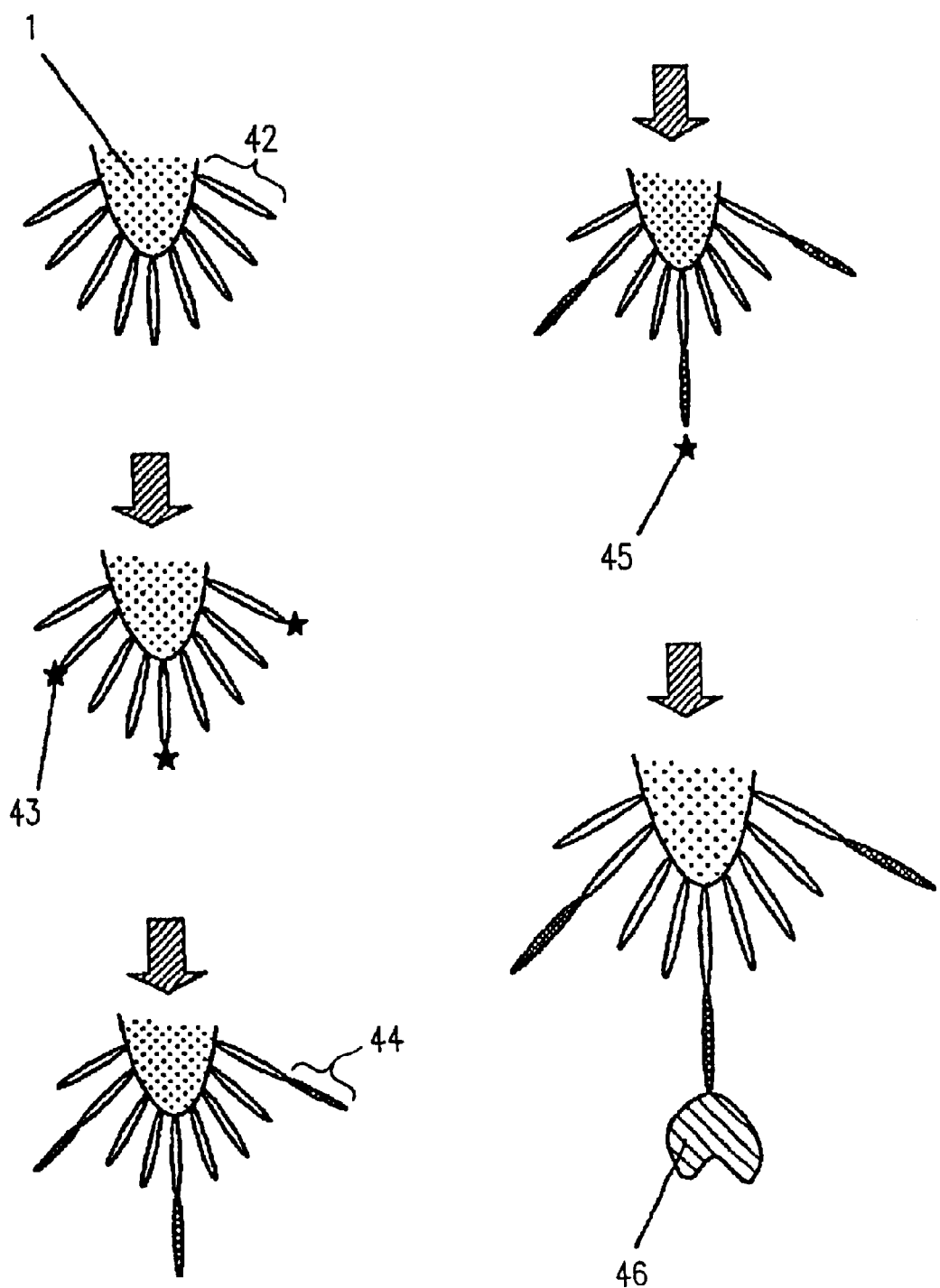
FIG. 4 generally illustrates a method for producing a probe of a scanning probe microscope of the present invention. Reference numerals in FIG. 4 denote the following elements: 1: a probe of a scanning probe microscope; 42: monolayer; 43: a substituted molecule end; 44: second monolayer; 45: a substituted molecule end; 46: a molecule having a sensor function or catalyst function.

A first method for producing a probe of a scanning probe microscope of the present invention comprises, as shown in FIG. 4, a step of forming a first monolayer 42 on the probe 1; a step of substituting end groups of some molecules included in the first monolayer 42 with other functional groups by a chemical reaction performed at a substitution efficiency of lower than 1; a step of forming a second monolayer 44 of molecules which are bound to the substituted functional groups 43: and a step of forming a third monolayer over the second monolayer 44 so as to produce a probe on which two or more monolayers are formed.

For example, in the case where the first monolayer 42 including an alkyl chain is formed on the probe tip surface having a radius of curvature of 20 nm at a coverage rate of 100%, the first monolayer 42 contains about 10,000 molecules. Over the first monolayer 42, the second monolayer 44 is formed at a substitution efficiency of 0.5, the third monolayer is formed at a substitution efficiency of 0.5, and subsequent layers are formed in a similar manner at a substitution efficiency of 0.5 for each layer. In the resultant layered structure, the number of molecules included in the 11th layer above the probe tip surface is about 10.

In this specification, such a structure is referred to as a "pyramid structure".

The first monolayer 42 formed over the surface of the probe can be formed by a self-assembling method. For example, it is possible to form the first monolayer 42 by immersing a probe for a certain time period in a solution in which a long chain molecule having at a molecule end a thiol group (—SH), a chlorosilyl group (Si—Cl), or an alkoxyl group (Si—OR; R denotes an alkyl group such as a methyl group, an ethyl group) is dissolved.

If the molecule end is a thiol group, it is necessary to cover the surface of the probe with gold before immersion into the solution. When a molecule having a chlorosilyl group at its molecule end is used to form a monolayer, the monolayer formed is excellent in durability because the chlorosilyl group establishes a strong chemical bond with the probe. When another molecule end of the molecule included in the monolayer is a vinyl group (C=C) or a bromo group (—CBr), this molecule end can be readily substituted with a functional group having high reactivity, such as an amino group (—NH$_2$), a carboxyl group (—COOH), a silanol group (—SiOH), a hydroxyl group (—OH), or the like. When the substitution efficiency is set to lower than 1, molecule ends of some molecules included in the first monolayer are substituted with functional groups having high reactivity.

Next, molecules which react with, and bond to, the substituted functional groups are used to form a second monolayer. For example, a molecule having a chlorosilyl group or an alkoxyl group can establish a chemical bond with the above-described functional group. Further, for example, if a molecule end of a molecule included in the first layer is substituted with an amino group, the molecule can establish a peptide bond (—NH—CO—) with a molecule in the second layer which has a carboxyl group. Thereafter, molecule ends of molecules included in the second monolayer are substituted in a similar manner with functional groups having high reactivity at a reaction efficiency of lower than 1, and then, a third monolayer is formed. Based on such a procedure, a multilayer structure where the outermost monolayer has a lower molecule density can be formed. By giving a sensor function or catalytic function to the outer monolayer, the chemical structure of a single molecule can, in principle, be measured or processed.

A molecule, such as a base of a DNA, an antibody, or a protein, may be bonded to a molecule included in the outermost monolayer. In FIG. 4, an outermost molecule is present over the probe tip surface. However, a molecule may not be present above the probe tip surface. In such a case, the probe is rotated around the longitudinal axis of the probe or around any axis perpendicular to the longitudinal axis of the probe such that a region of the probe on which a molecule in the outer layer is present is located in the vicinity of a sample to be measured. After the probe has been rotated, the region of the probe located in the vicinity of the sample is referred to as a probe tip surface.

Embodiment 5

A second method for producing a probe of a scanning probe microscope of the present invention comprises: a step of forming an organic monolayer on the probe; and a step of causing a chemical reaction in the organic monolayer at a probe tip surface by bringing the probe tip surface into contact with a surface of a solid substance having a catalytic function. Herein, the chemical structure of the monolayer can be changed only at the probe tip surface by controlling an area where the probe comes into contact with the surface of the solid substance. A molecule having a chemical sensor function or catalytic function is fixed to the changed portion, whereby a chemical sensor function or catalytic function can be conferred to only the probe tip surface.

Figure 5:
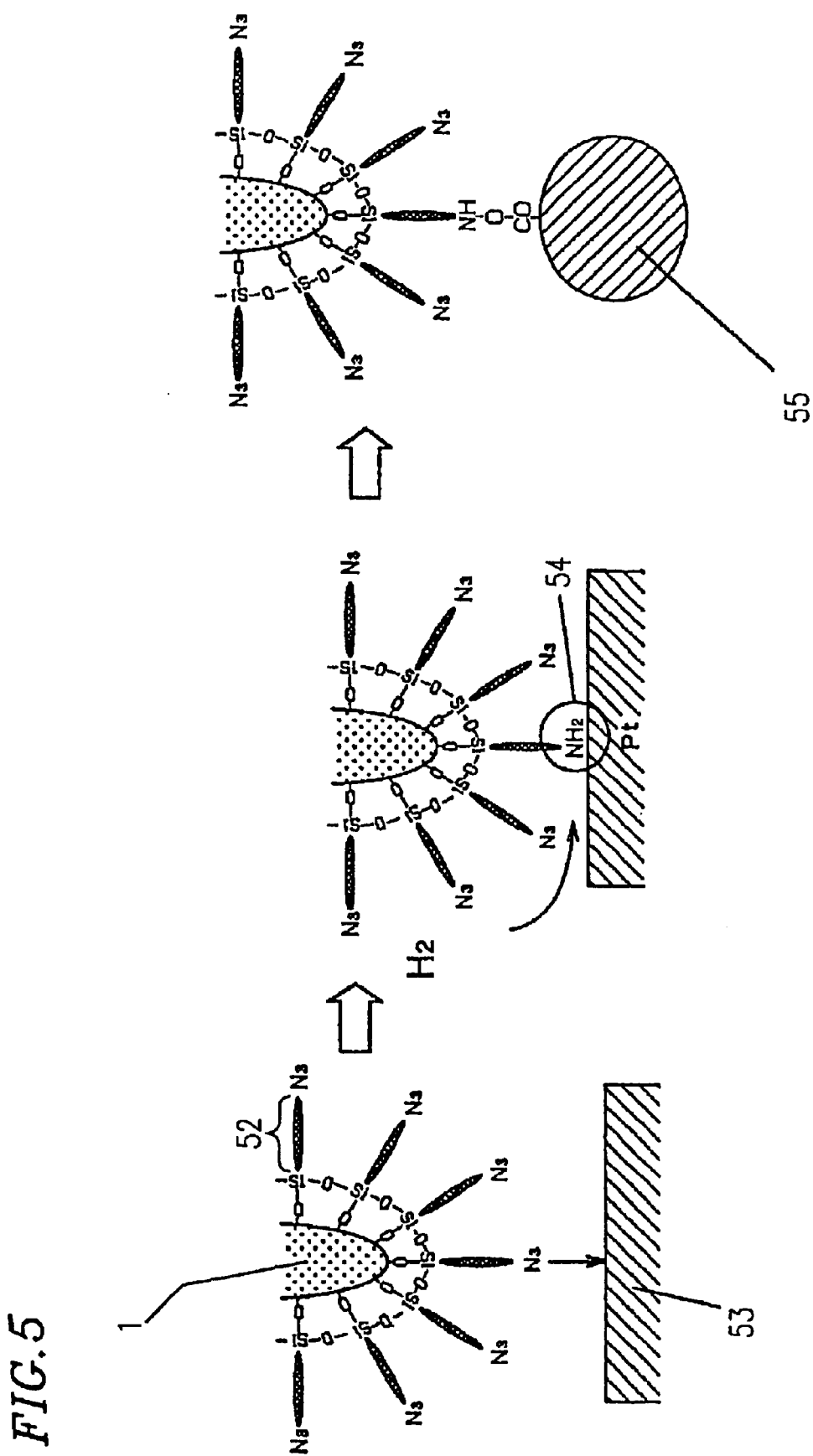
FIG. 5 generally illustrates a method for producing a probe of a scanning probe microscope of the present invention. Reference numerals in FIG. 5 denote the following elements: 1: a probe of a scanning probe microscope; 52: monolayer; 53: a solid catalyst (Pt); 54: a reaction portion; 55: a molecule having a sensor function or catalyst function.

An example of such a probe is shown in FIG. 5. Over the probe 1, a self-assembled monolayer 52 is formed in the same manner as described above in conjunction with the first production method of the probe of the present invention. A molecule end of a molecule included in the monolayer is a functional group so that a chemical reaction is caused when the molecule end comes into contact with a specific solid catalyst 53. For example, if the molecule end is an azide group ($—CN_3$), the functional group is substituted with an amino group when it comes into contact with platinum 53 in a solution which contains hydrogen gas. Thus, when the tip of the probe is placed in the close vicinity of a platinum plate in an aqueous solution containing hydrogen gas, a molecule end of a molecule included in the monolayer at the probe tip surface which is in contact with the platinum plate is substituted with an amino group. If a sensor molecule or catalyst molecule 55 is bonded to the probe via this amino group, the sensor molecule or catalyst molecule 55 is present only at the probe tip surface. With such a probe, in principle, the chemical structure of a single molecule can be measured or processed.

After the first sensor molecule or catalyst molecule 55 is bonded to the probe tip surface as described above, the probe is rotated, or moved, around the longitudinal axis thereof or around an axis perpendicular to the longitudinal axis, and the above operation is performed again, whereby a second sensor molecule or catalyst molecule, which has a function different from the first sensor molecule or catalyst molecule 55, can be placed at a different site on the probe tip surface. Thus, by placing a plurality of types of sensor molecules or catalyst molecules on the probe tip surface, different operations can be simultaneously performed through a single process of scanning a sample with the probe.

Embodiment 6

A third production method of the present invention is more useful in adjusting a contact of a probe and a catalyst. In the third method, an organic monolayer is first formed on a surface of a probe. Then, a surface of a solid substance, which includes at least one region having a catalytic function, is scanned with the probe, so that only organic molecules which are present at the probe tip surface are chemically reacted when the probe is brought into contact with, or placed in the close vicinity of, the region having a catalytic function. In this method, the surface area of the probe which is in contact with a solid substance having a catalytic function can be accurately controlled by adjusting the distance between the probe and the solid substance during the time when a region not having a catalytic function is scanned with the probe. As a result, the chemical structure of the monolayer can be changed only in a specific portion of the probe tip surface. A molecule having a chemical sensor function or catalytic function is fixed to the changed portion, whereby a chemical sensor function or catalytic function can be conferred to only the probe tip surface.

Embodiment 7

A fourth production method of the present invention is also useful in adjusting a contact of a probe and a catalyst. In the fourth method, an organic monolayer is formed on a surface of a probe of a scanning probe microscope. When this monolayer comes into contact with a catalyst in the presence of a predetermined substrate, a reaction of the monolayer and the catalyst is caused. Next, the probe is moved toward the surface of the solid catalyst and then moved away therefrom. During repetition of such a reciprocation, the distance between the probe and the solid catalyst, which is achieved when the probe is moved close to the solid catalyst again, is adjusted. Thereafter, the substrate is supplied in the close vicinity of the probe and the solid catalyst. When the probe is brought into the close vicinity of the solid catalyst again, the chemical structure of the organic monolayer at the probe tip surface is changed.

By using this method, the surface area of the probe which is in contact with a solid substance having a catalytic function can be accurately controlled. As a result, the chemical structure of the monolayer can be changed only in a specific portion of the probe tip surface. A molecule having a chemical sensor function or catalytic function is fixed to the changed portion, whereby a chemical sensor function or catalytic function can be conferred to only the probe tip surface.

Embodiment 8

A fifth production method of a probe of a scanning probe microscope of the present invention is characterized in that an electrically conductive probe is immersed into a solution in which an electrochemically-polymerizable monomer and a catalyst molecule are dissolved, and an electrical voltage is applied to the probe, whereby the monomer is polymerized over the probe so as to form a cover layer such that the catalyst molecule is uptaken in the cover layer.

Embodiment 9

A sixth production method of a probe of a scanning probe microscope of the present invention includes: a step of immersing an electrically conductive probe into an electrochemically-polymerizable monomer solution, and applying an electrical voltage to the probe, whereby the monomer is polymerized on the probe surface so as to form a cover layer; and a step of immersing the probe into a solution in which a catalyst molecule is dissolved, and applying an electrical voltage to the probe, whereby the catalyst molecule contained in the solution is uptaken in the cover layer by means of electrostatic attraction. In the fifth and sixth probe production methods, pyrrole or aniline may be used as the electrochemically-polymerizable monomer. An aqueous solution or an organic solution containing an electrolyte dissolved therein is used as the solution in which the monomer is dissolved. A buffer solution is suitable when the catalyst molecule is a protein. This is because, in the buffer solution, a salt contained in the solution functions as an electrolyte, so as to suppress degeneration of the protein. The polymerization of the monomer on the probe is achieved by simply applying a certain voltage to the probe immersed in the solution. The thickness of a polymerization film (cover layer) formed over the probe is determined by controlling the time for which the voltage is applied, or the total electric charge which flows through the probe by electrolysis.

Figure 6:
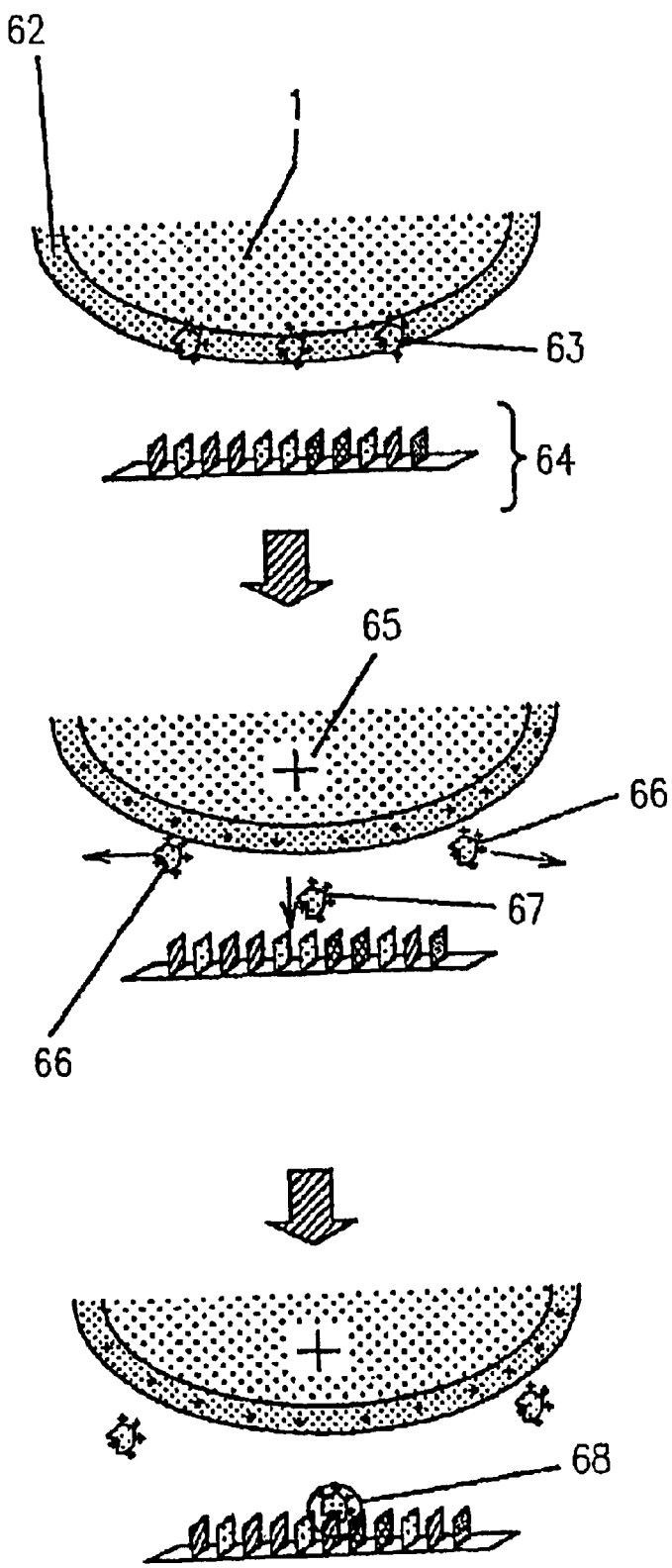
FIG. 6 generally illustrates a molecule processing method of the present invention. Reference numerals in FIG. 6 denote the following elements: 1: a probe of a scanning probe microscope; 62: electrically conductive polymer; 63: a catalyst; 64: a DNA to be processed; 65: a probe to which a positive potential is applied; 66: a catalyst diffused in a solution, which does not contribute to a reaction; 67: catalyst which contributes to a reaction; 68: a portion where a catalyst reacts with a specific base.

Further, the present invention provides a probe which includes a sensor molecule or catalyst molecule not only at the tip of the surface of the probe but also in a region on the probe surface other than the probe tip surface but which can, in principle, measure or process a single organic molecule. The present invention provides a processing method using such a probe. An example of such a probe and method is shown in FIG. 6. An electrically conductive material is used for the probe 1 such that an electrical voltage can be applied thereto. Thus, it is preferable to use a probe of a scanning electrochemical microscope or scanning tunneling microscope. The surface of the probe 1 is covered with an electrically conductive polymer 62, such as polypyrrole, polyaniline, polydiacetylene, or the like. A catalyst molecule 63 is uptaken in this polymer. In the case where the catalyst molecule 63 has an electric charge, the catalyst molecule 63 is released from the probe 1 by applying a voltage to the probe 1. Selection of a catalyst molecule having an electric charge is readily achieved. For example, when an enzyme is used, the enzyme is positively or negatively charged in an aqueous solution having a pH different from the isoelectric point of the enzyme.

In the case where the catalyst 63 is a microparticle of platinum, the microparticle can be charged similarly by controlling the pH of the aqueous solution. The probe 1 is placed in the vicinity of a molecule to be processed, and an electric voltage is applied to the probe 1, whereby the catalyst molecule 63 is released from the polymer 62. However, the direction of release of the molecule 63 is not stable. Some molecules 63 are released in a direction such that the molecules 63 come close to the molecule to be processed; other molecules 63 do not come close to the molecule to be processed, but are diffused in the solution. Furthermore, the release rate of the catalyst 63 is increased as the electric field in the film becomes larger. Since the radius of curvature at the tip of the probe 1 is small, the concentration of an electric field at the tip of the probe 1 is high, and accordingly, the release rate of the catalyst 63 is increased at the tip of the probe 1. Therefore, when a voltage is applied to the probe 1 after the probe 1 is placed as close to a molecule of a sample as possible, only a catalyst molecule present at the probe tip surface can be brought close to the molecule to be processed, while catalyst molecules present at the other region of the probe can be diffused in the solution. Thus, by using the above-described probe and processing method, in principle, the chemical structure of a single molecule can be processed.

In the polymerization film (cover layer) described in embodiments 8 and 9, a functional group, such as an amino group, is present at the surface of the film. The material used in the above-described first production method of a probe of the present invention, i.e., an organic molecule having a chlorosilyl group or an alkoxysilyl group at one end thereof, is brought into reaction with the functional group, whereby an organic molecule film can be formed on the surface of the cover layer. Furthermore, when the other molecule end of the organic molecule has a functional group, such as an azide group, which causes a chemical reaction when it comes into contact with a specific solid catalyst, a sensor molecule or catalyst molecule can be bonded only to the probe tip surface using the above-described second probe production method of the present invention. In this case, if an inorganic or organic catalyst contained in the electrically conductive polymer has a function different from the sensor molecule or catalyst molecule placed on the organic molecule film, after a single scanning operation where the sample is scanned with the probe using the sensor molecule or catalyst molecule placed on the probe tip surface, a voltage is applied to the probe such that the inorganic or organic catalyst contained in the electrically conductive polymer is released, whereby different operations can be simultaneously performed through a single process of scanning a sample with the probe. It should be noted that, since the organic molecule film formed over the electrically conductive polymer layer has a very sparse structure (i.e., low density), the organic molecule film does not prevent the catalyst molecule from being released by application of the voltage to the probe.

Hereinabove, the embodiments of the present invention have been described. In the examples below, the present invention is described in more detail. It should be noted that the present invention is not limited to the examples below.

Hereinafter, the present invention is specifically described with reference to the examples. The present invention is not limited to these examples.

EXAMPLE 1

A probe of an atomic force microscope, which was made of silicon nitride, was irradiated with an ultraviolet ray in the presence of ozone, whereby a surface of the probe was cleaned. Next, for the purpose of forming a first monolayer, the probe was immersed for 1 hour in a mixed solution of n-hexadecane and chloroform (volume ratio 4:1) containing 1 vol % of 18-dimethylisilyloctadecyltrichlorosilane ($H(CH_3)_2Si(CH_2)_{18}SiCl_3$) dissolved therein. Next, the probe was removed from the solution and cleaned with chloroform. The above operations were performed in a glove box filled with dry nitrogen gas. As a result, over the surface of the probe, a first monolayer of $H(CH_3)_2Si(CH_2)_{18}Si$—O was formed. Next, the resultant probe was immersed for about 10 minutes in a mixed solution of tetramethylammoniumhydroxide (TMAH) and methanol, and washed with water. As a result, a molecule end of the first monolayer was a silanol group (SiOH).

Next, the resultant probe was immersed for 1 hour in a mixed solution of n-hexadecane and chloroform (volume ratio 4:1) containing 1 vol % of 19-vinylhexadecyltrichlorosilane ($CH_2$=$CH(CH_2)_{16}SiCl_3$) dissolved therein. Next, the probe was removed from the solution and cleaned with chloroform. The above operations were performed in a glove box filled with dry nitrogen gas. As a result, a second monolayer of $CH_2$=$CH(CH_2)_{16}Si$—O was formed on the probe, such that the film density of the second monolayer, i.e., the density of molecules contained in the second monolayer was lower than that of the first monolayer. Next, the resultant probe was reacted for about 10 seconds with a tetrahydrofuran solution in which diborane was dissolved at the concentration of 1 mol/l. This operation was performed in an argon atmosphere. Next, the resultant probe was reacted for 1 minute with a mixed solution of oxygenated water ($H_2O_2$; 30 vol %) and sodium hydroxide (NaOH; 0.1 mol/l). As a result, molecule ends of some of the molecules included in the second monolayer were substituted with alcohol groups (COH). Next, the resultant probe was immersed for 1 hour in a mixed solution of n-hexadecane and chloroform (volume ratio 4:1) containing 1 vol % of 10-bromodecyltrichlorosilane ($BrCH_2(CH_2)_9SiCl_3$) dissolved therein.

Next, the probe was removed from the solution and washed with chloroform. The above operations were performed in a glove box filled with dry nitrogen gas. As a result, a third monolayer of $BrCH_2(CH_2)_9Si$—O was formed, such that the film density of the third monolayer was lower than that of the second monolayer. Next, the resultant probe was immersed for about 1 hour in a solution where 200 mg of $NaN_3$ was dissolved in 25 ml of dimethylformamide, and thereafter, the probe was washed with dimethylformamide. Through this operation, Br at a molecule end of a molecule included in a portion of the third monolayer was substituted with $N_3$. Next, the probe was immersed for one night in 1 liter of ether solution containing 10 g of $LiAlH_4$. Thereafter, the probe was washed with an ether solution and immersed in a 10 vol % hydrochloric solution. Then, the resultant probe was immersed in a $(C_2H_5)_3N$ solution for two hours, and washed with chloroform. As a result, the molecule end, which had been substituted with $N_3$, was substituted with $NH_2$.

The same processing as that described above was performed on a surface of a silicon nitride base material, which is the same as the material of the probe, and an organic molecule film formed on the surface of the silicon nitride base material was analyzed by an FT-IR method. As a result, it was found that the number of molecules contained in the second monolayer was about 1/1000 of that in the first monolayer, and the number of molecules contained in the third monolayer was about 1/10000 of that in the first monolayer. Thus, it was indirectly proved that, among the first to third organic layers on the probe, the density of molecules included in the organic molecule films is lower in a film at a higher level.

EXAMPLE 2

A layered structure was formed on a probe using the same method as that described in Example 1, such that a molecule end of a molecule included in the outermost monolayer was an amino group. Next, this probe was immersed for 30 minutes in an aqueous solution containing 2.5 wt % glutaraldehyde, and then washed with water. Thereafter, the probe was immersed for 1 hour in a phosphate buffer solution of pH=7.0 containing 10 wt % glucose oxidase (which is an enzyme derived from yeast). As a result, the amino group at the molecule end of the molecule contained in the outermost monolayer of the layered structure was covalently bonded to the enzyme.

EXAMPLE 3

A probe of an atomic force microscope, which was made of silicon nitride, was irradiated with an ultraviolet ray in the presence of ozone, whereby a surface of the probe was cleaned. Next, for the purpose of forming a first monolayer, the probe was immersed for 1 hour in a mixed solution of n-hexadecane and chloroform (volume ratio 4:1) containing 1 vol % of 10-bromodecyltrichlorosilane ($BrCH_2(CH_2)_9SiCl_3$) dissolved therein. Next, the probe was removed from the solution and cleaned with chloroform. The above operations were performed in a glove box filled with dry nitrogen gas. As a result, a monolayer having a 10-bromodecyl group was formed on the probe. Next, the probe was immersed for 12 hours in a solution where 200 mg of $NaN_3$ was dissolved in 25 ml of dimethylformamide, and then washed with dimethylformamide. Through this operation, Br at the molecule end of a molecule contained in the monolayer was substituted with $N_3$. Next, the resultant probe was installed in an AFM apparatus, and then, the probe was brought close to a silicon plate, on which platinum was deposited, using a piezoelectric element. This operation was arranged such that both the probe and the silicon plate came into contact with 2-propanol containing hydrogen gas. As a result, the molecule end of a molecule contained in the monolayer at the probe tip surface was substituted with an amino group ($—NH_2$) due to a catalytic function of platinum.

Figure 7:
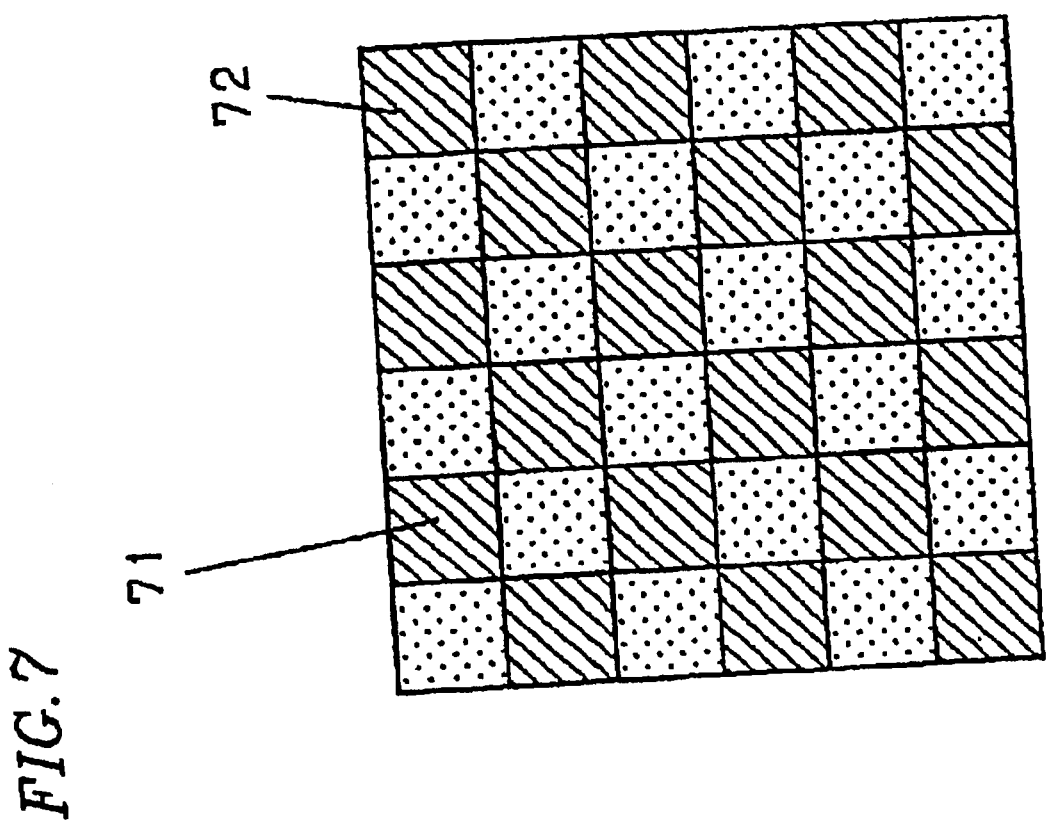
FIG. 7 generally illustrates a base material where two types of monolayer films are fixed onto a pattern. Reference numerals in FIG. 7 denote the following elements: 71: COOH(CH$_2$)$_{14}$SH (area: 3×3 $\mu$m$^2$); 72: CH$_3$(CH$_2$)$_{17}$SH (area: 3×3 $\mu$m$^2$).

The following measurements were performed in order to confirm that a portion of the monolayer at the probe tip surface was substituted with an amino group. As shown in FIG. 7, a pattern of octadecanethiol ($CH_3(CH_2)_{17}SH$) 72 and 14-carbonylhexadecanethiol ($COOH(CH_2)_{14}SH$) 71 was formed over a gold-coated silicon plate. The distribution of friction force over the pattern was measured using a probe fabricated using the above described method. For the purpose of distinguishing a monolayer containing a methyl group and a monolayer containing a carboxyl group, the carbon number of the monolayer containing a methyl group was greater than that of the monolayer containing a carboxyl group by 4.

According to the result of measurement performed in ethanol, the friction force over the monolayer containing a carboxyl group is greater than that over the monolayer containing a methyl group. On the other hand, the same measurements were performed using an untreated probe, and a probe having a monolayer where a molecule end had not been substituted with an amino group. In these measurements, a difference of friction force was not determined between the patterned two types of monolayers. The reason that the friction force over the monolayer containing a carboxyl group was large is considered as being because the Van der Waals force between an amino group and a carboxyl group is greater than that between an amino group and a methyl group. Accordingly, it is considered that amino groups were present in the monolayer at the probe tip surface.

Furthermore, the force curve between the probe fabricated according to the above described method and a monolayer containing 14-carbonylhexadecanethiol was measured. In the force curve measurement process, a sample was reciprocated at a frequency of 1 Hz along the z-axis direction such that the sample repeatedly comes into contact with, and moves away from, the probe, so as to determine the relationship between the force exerted on the probe and the travel distance of the sample along the z-direction (which is related to the distance between the probe and the sample).

Figure 8:
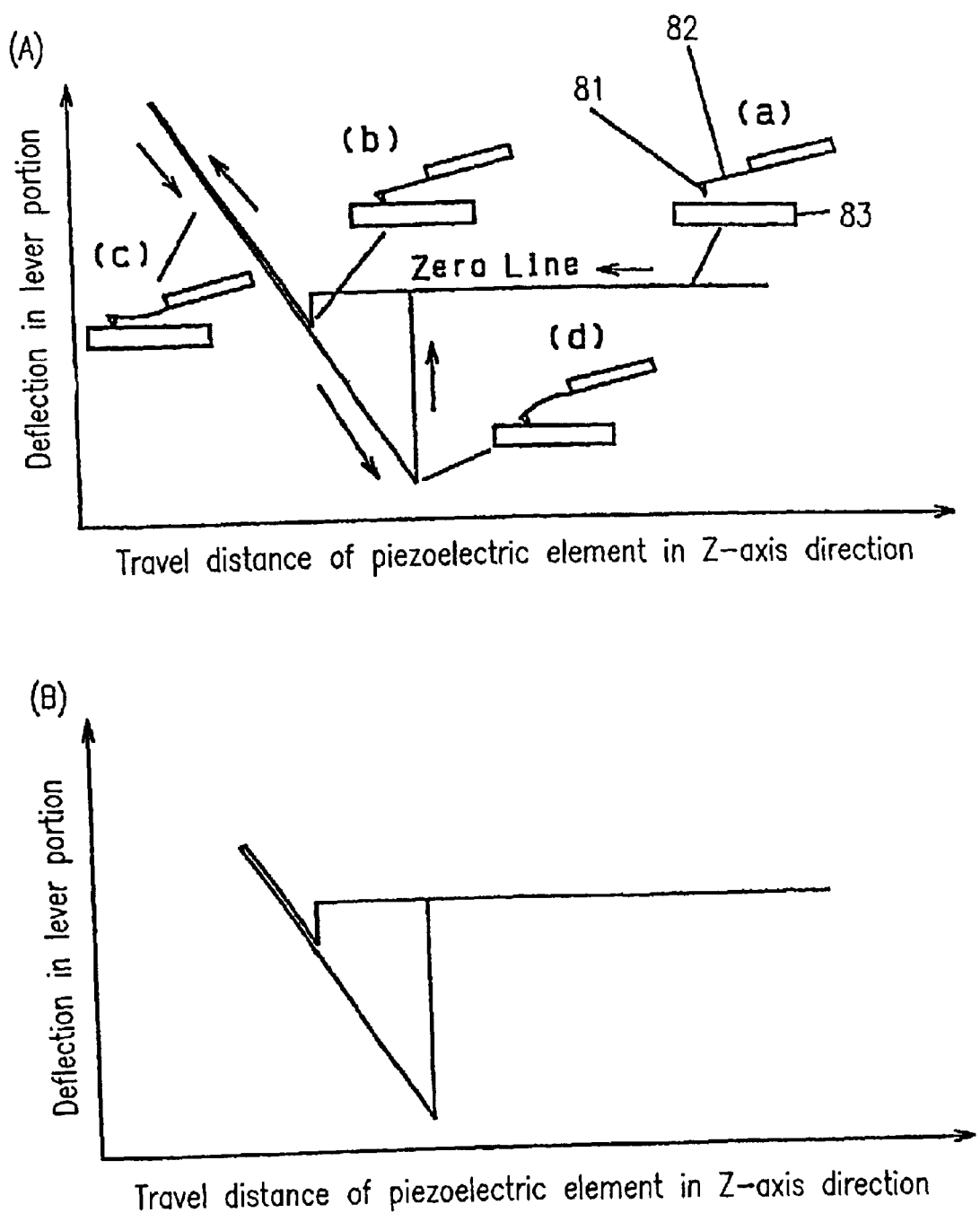
FIG. 8 presents graphs showing a force curve measured using a probe of the present invention. Part (A) is a graph showing a force curve measured between a probe to which an amino group is fixed and a monolayer where a molecule end is a carboxyl group. Part (B) is a graph showing a force curve measured between a probe to which an amino group is fixed and a monolayer where a molecule end is a carboxyl group. Reference numerals in FIG. 8 denote the following elements; 81: a probe; 82: a lever portion.

Section (A) of FIG. 8 shows a typical force curve measured in the above measurement process. The force curve was measured in ethanol. The horizontal axis represents the travel distance of a piezoelectric element along the z-direction. In this example, the horizontal axis represents the travel distance of the sample 83 because the sample 83 was fixed onto the piezoelectric element. Further, the vertical axis represents the deflection in the lever portion 82. In a region above the "Zero Line", repulsive force was exerted on the probe 81 so that the lever portion 82 is deflected in a direction deviating from the sample. In a region below the "Zero Line", attractive force was exerted on the probe 81 so that the lever portion 82 is deflected toward the sample. In state (a) where the sample 83 was sufficiently distant from the probe 81, substantially no force is exerted between the probe 81 and the sample 83, so that the lever portion 82 is not deflected. When the piezoelectric element is gradually extended such that the sample 83 is moved closer to the probe 81, the probe 81 abruptly comes into contact with the sample 83 at a certain point due to Van der Waals attraction, resulting in state (b). Such phenomenon occurred because the spring constant of the lever portion 82 is smaller than a differential value of the Van der Waals exerted on the probe 81 between the probe 81 and the sample 83.

The piezoelectric element was further extended such that the sample 83 was pressed against the probe 81. As a result, repulsive force was caused in the probe 81, resulting in state (c) where the lever portion 82 was deflected such that the central portion of the lever portion 82 was deviated from the sample 83. Next, the piezoelectric element was retracted. Even when the piezoelectric element was retracted to a position where the sample 83 first came into contact with the probe 81, the probe 81 was not detached from the sample 83. With further retraction, the probe 81 was detached from the sample 83. The moment when the probe 81 was detached from the sample 83 is shown in state (d). The force which is required to detach the probe 81 from the sample 83 is herein defined as adsorptive force. The adsorptive force is substantially equal to the Van der Waals force caused between the probe 81 and the sample 83. It is thought that the Van der Waals force produced in this example results from a force caused between an amino group and a carboxyl group.

Section (B) of FIG. 8 shows another force curve, which is different from the above described force curve in the amount of depression of the probe 81 against the sample 83 which was caused after the sample 83 came into contact with the probe 81. In this force curve, the amount of depression is smaller than that caused for the above described force curve. When the amount of depression varies, the surface area of the probe 81 which is in contact with the sample 83 differs accordingly. Since the sample 83 elastically deformed when the probe 81 is pressed against the sample 83, the surface area of the probe 81 which is in contact with the sample 83 becomes larger as the amount of depression increases. However, in this force curve, the adsorptive force was substantially identical even though the amount of depression was varied. This means that only an amino group present at the probe tip surface contributed to the Van der Waals force, whereas the other portion of the probe did not contribute to the Van der Waals force. Thus, it was proved that an amino group was formed at the probe tip surface.

For reference, a monolayer having an amino group at a molecule end was formed over the entire probe according to the same method as that described in Example 1. The force curve was measured using this probe between the probe and a monolayer having a carboxyl group at a molecule end. The adsorptive force became larger as the force for pressing the probe against a sample monolayer film increased. This means that the entire surface of the probe was covered with the monolayer having an amino group at a molecule end.

EXAMPLE 4

A monolayer was formed on a probe using the same method as that described in Example 3, such that the molecule end of the molecule included in the monolayer was $NH_2$. The resultant probe was immersed for 30 minutes in an aqueous solution containing 2.5 wt % glutaraldehyde, and then washed with water. Thereafter, the probe was immersed for 1 hour in a phosphate buffer solution of pH=7.0 containing 10 wt % amino peptidase (which is an enzyme derived from a bovine renal tubule). As a result, the enzyme was bonded to the monolayer containing a molecule whose molecule end is an amino group. Next, the resultant probe was used to process a protein thin film. For this process, a monolayer film of bovine serum albumin was fixed onto a silicon plate using the Langmuir-Blodgett method, so as to form a sample plate. Since albumin is readily adsorbed to a water/air interface, a monolayer of albumin can be formed on the silicon plate by using a commonly-employed method.

Next, the silicon plate onto which the monolayer of albumin was fixed, and the tip surface of a probe onto which amino peptidase was fixed, were immersed together in a buffer solution. The buffer solution used herein contained an inhibitor for polypeptidase. Amino peptidase has a function of hydrolyzing a peptide bond of a protein. Next, a force curve was measured, and the surface area of the probe which was in contact with the sample was adjusted so as to be about $0.1 \times 0.1$ nm$^2$. As long as the probe and the sample are in this state, even when the probe comes into contact with the thin film of albumin, the probe does not hydrolyze-albumin due to an effect of the inhibitor. Next, the buffer solution was continuously renewed, whereby the inhibitor was removed from the solution. Next, the buffer solution was continuously substituted with a buffer solution containing an inhibitor. Thereafter, a region of $20 \times 20$ nm$^2$ ranging around a center point where the force curve was measured while the force caused between the probe and the sample was kept constant.

As a result, it was found that albumin was removed from a region of $0.1 \times 0.1$ nm$^2$ forming a hole. For reference, the same procedure was performed using a probe onto which an enzyme was not fixed, but a hole was not formed in the albumin film. This result indicates that, when the probe tip surface onto which amino peptidase was fixed came into contact with the monolayer of albumin, a polypeptide bond of albumin was hydrolyzed, and the hydrolyzed compound was dissolved in the solution, whereby a hole was formed.

EXAMPLE 5

Figure 9:
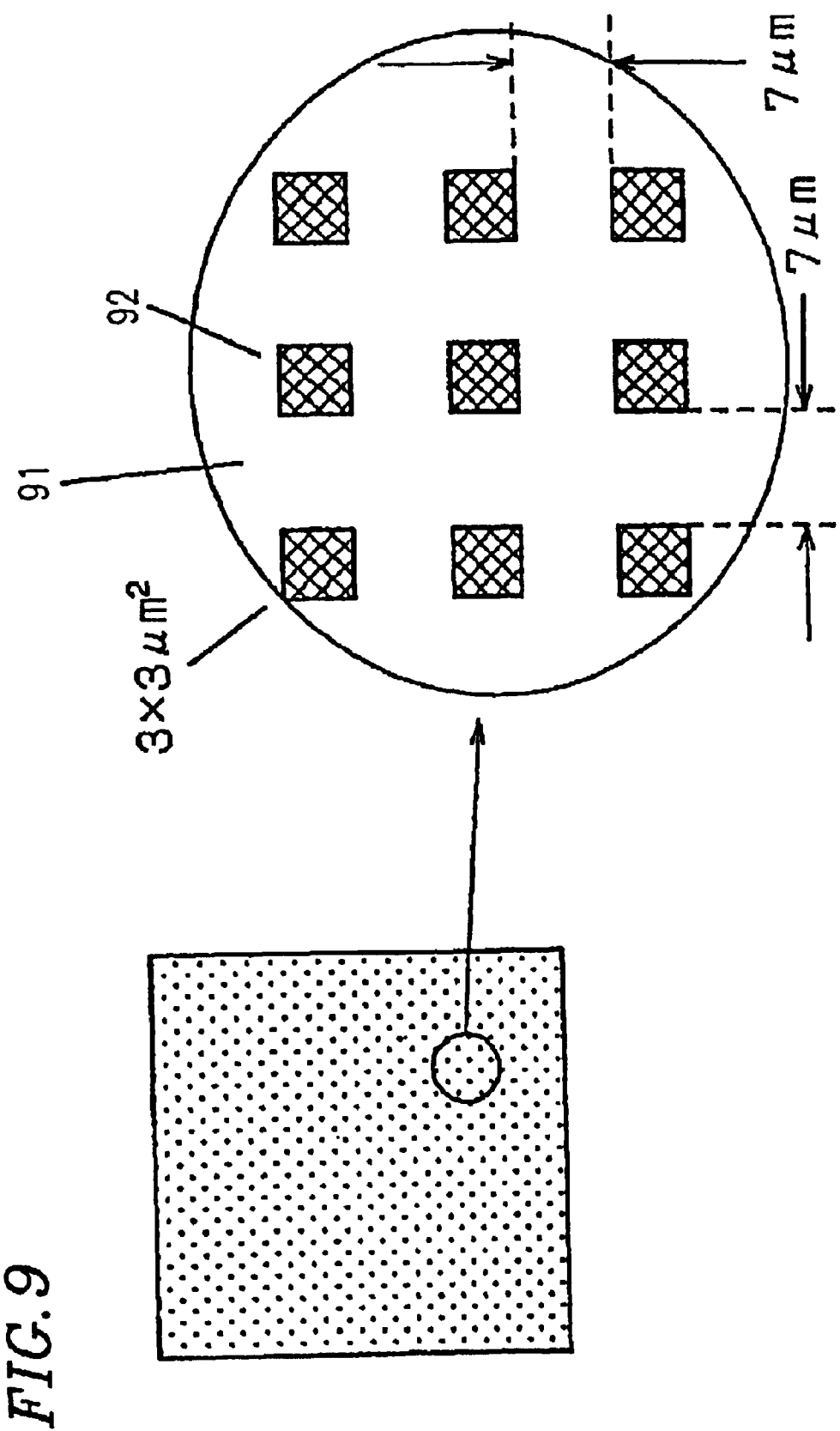
FIG. 9 shows a silicon plate on which platinum is patterned. Reference numerals in FIG. 9 denote the following elements; 91: a silicon plate; 92: a platinum pattern.

A monolayer was formed on a probe of an atomic force microscope, which was made of silicon nitride, using the same method as that described in Example 3, such that a molecule end of a molecule included in the monolayer was $N_3$. On the other hand, a patterned platinum thin film was formed on a silicon plate. On the silicon plate 91, a $3 \times 3$ μm$^2$ platinum pattern 92 was formed as shown in FIG. 9. Next, the probe and the plate were immersed in a 2-propanol solution, and a region of $30 \times 30$ μm$^2$ over the plate was measured with the probe while the force caused between the probe and a base material was kept constant. As a result, the platinum pattern 92 was observed. Under this measurement condition, $N_3$ at the probe tip surface was not substituted with $NH_2$ even when the probe was in contact with platinum, because hydrogen is not contained in 2-propanol. Next, a feedback of a piezoelectric element was adjusted while the surface of the base material was scanned with the probe, such that the repulsive force between the probe and the plate was 1.5 nN. Thereafter, hydrogen gas was introduced as a substrate into 2-propanol. As a result, $N_3$ in the monolayer over the probe tip surface was substituted with $NH_2$ when the probe came into contact with platinum.

In the same manner as that described in Example 4, the force curve was measured on a monolayer including a molecule whose molecule end is a carboxyl group. As the pressing force of the probe against the sample was increased after the probe came into contact with the sample, the adsorptive force was increased. However, after the pressing force exceeded 1.5 nN, the adsorptive force was not increased any further. This indirectly proves that only a molecule end of a molecule included in the monolayer at the probe tip surface was substituted with an amino group. The surface area of the probe which is in contact with the sample when the probe is pressed against the sample with a power of 1.5 nN can be calculated based on the Hertzian contact formula, formula (1):

$$S = k \times (P)^{2/3} \quad (1)$$

where S denotes the contact area (nm$^2$); P denotes the repulsive force (nN) between the probe and the sample; k denotes a constant, which is determined by elastic constants of the probe and the sample, and the radius of curvature of the probe tip surface.

In this example, the probe was made of silicon nitride, the sample plate was made of silicon, and the radius of curvature at the tip of the probe was 50 nm. Accordingly, k is about 2.3. Thus, when the repulsive force is 1.5 nN, S is 3 (S=3). Therefore, it can be said that an amino group is present in a 3 nm$^2$ region at the probe tip surface. Considering that the area of a single molecule included in the monolayer is 0.25 nm$^2$, it is estimated that molecule ends of 12 molecules which are present at the probe tip surface are amino groups.

EXAMPLE 6

A monolayer was formed on a probe using the same method as that described in Example 5, such that a molecule end of a molecule included in the monolayer was NH$_2$. The resultant probe was immersed for 30 minutes in an aqueous solution containing 2.5 wt % glutaraldehyde, and then washed with water. Thereafter, the probe was immersed for 1 hour in a phosphate buffer solution of pH=7.0 containing 10 wt % amino peptidase, which is an enzyme. As a result, the enzyme was bonded to the monolayer containing a molecule whose molecule end is an amino group. Further, a protein film was processed in the same manner as that described in Example 4. However, in the force curve process performed in this example, the surface area of the probe which was in contact with the sample protein film was equal to or greater than 10×10 nm$^2$. If amino peptidase were bonded to the entire surface of the probe, a hole would be formed in the surface area of the protein film which was in contact with the probe. However, the size of the hole actually formed in the film was equal to or smaller than 1 nm$^2$. This means that amino peptidase was fixed onto only the probe tip surface.

EXAMPLE 7

A monolayer was formed on a probe of an atomic force microscope, which is made of silicon nitride, using the same method as that described in Example 3, such that a molecule end of a molecule included in the monolayer was N$_3$. On the other hand, a platinum thin film was formed on a silicon plate. Next, the probe and the plate were immersed in a 2-propanol solution, and the force curve was measured. The force curve measurement is a method for examining the relationship between the force exerted on the probe and the travel distance of the sample while the sample is reciprocated only along the z-direction without being moved along the x- or y-direction. The travel direction of the sample along the z-direction was adjusted while measuring the force curve, whereby the surface area of the probe which is in contact with the sample can be adjusted. In this example, the force curve was adjusted such that the surface area of the probe which is in contact with platinum is 1 nm$^2$. Under these conditions, N$_3$ is not substituted with NH$_2$ even when the probe is in contact with platinum. By introducing hydrogen gas into 2-propanol, N$_3$ at a molecule end of a molecule included in the monolayer was substituted with NH$_2$ within a 1 nm$^2$ area where the probe is in contact with platinum. Through a force curve measurement similar to that performed in Example 5, it was confirmed that a molecule end of a molecule included in the monolayer was substituted with NH$_2$ within the area above the probe tip surface.

EXAMPLE 8

A monolayer was formed on a probe using the same method as that described in Example 7, such that a molecule end of a molecule included in the monolayer was NH$_2$. The resultant probe was immersed for 30 minutes in an aqueous solution containing 2.5 wt % glutaraldehyde, and then washed with water. Thereafter, the probe was immersed for 1 hour in a phosphate buffer solution of pH=7.0 containing 10 wt % amino peptidase, which is an enzyme. As a result, the enzyme was bonded to the monolayer containing a molecule whose molecule end is an amino group. Further, a protein film was processed in the same manner as that described in Example 4. However, in the force curve process performed in this example, the surface area of the probe which was in contact with the sample protein film was equal to or greater than 10×10 nm$^2$. If amino peptidase was fixed to the entire surface of the probe, a hole would be formed in a surface area of the protein film which was in contact with the probe. However, the size of a hole actually formed in the film was equal to or smaller than 1 nm$^2$. This means that amino peptidase was only fixed onto the probe tip surface.

EXAMPLE 9

A monolayer was formed on a probe using the same method as that described in Example 7, such that a molecule end of a molecule included in the monolayer was NH$_2$. Thereafter, deoxyribonuclease (derived from a bovine pancreas) was bonded to the resultant probe using the same method as that described in Example 8. Deoxyribonuclease is an enzyme which hydrolyzes a phosphoric ester bond of a DNA, thereby dissecting the DNA.

Next, a single stranded DNA consisting of 100 bases was fixed onto a micaceous plate. Hereinafter, a method for fixing a DNA is described. Cleaved muscovite was exposed to water vapor plasma, whereby a hydroxyl group was introduced into the surface of the muscovite. Thereafter, the micaceous plate was immersed in an ethanol solution containing 1 vol % 3-aminopropyltrimethoxysilane. The micaceous plate was then washed with ethanol and water in this order, and dried for 10 minutes at 100° C. Through this operation, a monolayer containing a molecule whose molecule end is an amino group is formed over the mica. Thereafter, the mica was immersed for 10 minutes in pure water which contains 1 vol % of a single stranded DNA consisting of 100 base pairs. Then, the mica was washed gently with water, and dried at room temperature. In the monolayer over the mica immersed in the neutral aqueous solution, an amino group was electrolytically dissociated so as to be positively charged, and a DNA negatively charged. Thus, the DNA was fixed onto the micaceous plate by the above described method.

Next, the micaceous plate and the probe were immersed in a phosphate buffer solution of pH=7, and measurement was performed. The measurement was performed in the presence of an inhibitor for deoxyribonuclease. In the presence of an inhibitor, deoxyribonuclease does not produce an enzyme activity, and does not dissect a DNA even when deoxyribonuclease comes into contact with the DNA. Through the measurement, the position on the substrate where the DNA existed was identified. Then, the probe was moved to a position above the DNA, and the force curve measured above the DNA. In the force curve measurement, the surface area of the probe which was in contact with the DNA was adjusted so as to be equal to or greater than 1 nm$^2$. Under such conditions, the buffer solution was continuously renewed, whereby the inhibitor was removed from the solution. Under such conditions, when the probe comes into contact with the DNA, the DNA is hydrolyzed due to a function of deoxyribonuclease, whereby the DNA is dissected. Thereafter, the buffer solution was continuously substituted with a buffer solution containing an inhibitor, and then, the DNA was measured. As a result, a dissected portion was found in the DNA. The size of the dissected portion was equal to or smaller than 0.1 nm. If deoxyribonuclease were fixed onto the entire surface of the probe, a portion of the DNA which is in contact with the probe would be hydrolyzed, and thus, the dissected portion must have a greater size. The above result of this example means that deoxyribonuclease was fixed only to the probe tip surface.

EXAMPLE 10

A probe of an STM (scanning tunneling microscope), which is made of platinum, was immersed in a phosphate buffer solution of pH=7 containing 10 mM of pyrrole and 1 wt % amino peptidase (derived from a bovine renal tubule; isoelectric point: pH=5.0). A voltage of 0.7 V (with respect to a standard reference electrode of Ag/AgCl) was applied to the probe for 1 ms, whereby a polypyrrole film containing polypeptidase was formed over the surface of the probe.

EXAMPLE 11

A probe of an STM, which is made of platinum, was immersed in a phosphate buffer solution of pH=7 containing 10 mM of pyrrole. A voltage of 0.7 V (with respect to a standard reference electrode of Ag/AgCl) was applied to the probe for 1 ms, whereby a polypyrrole film was formed over the surface of the probe. Next, the probe was immersed in a phosphate buffer solution of pH=7.0 containing 10 wt % amino peptidase (derived from a bovine renal tubule; isoelectric point:pH=5.0). A voltage of 1.0 V(with respect to a standard reference electrode of Ag/AgCl) was applied to the probe. Since amino peptidase was negatively charged in the solution of pH=7.0, amino peptidase was attracted by an electric field and uptaken into polypyrrole.

EXAMPLE 12

Figure 10:
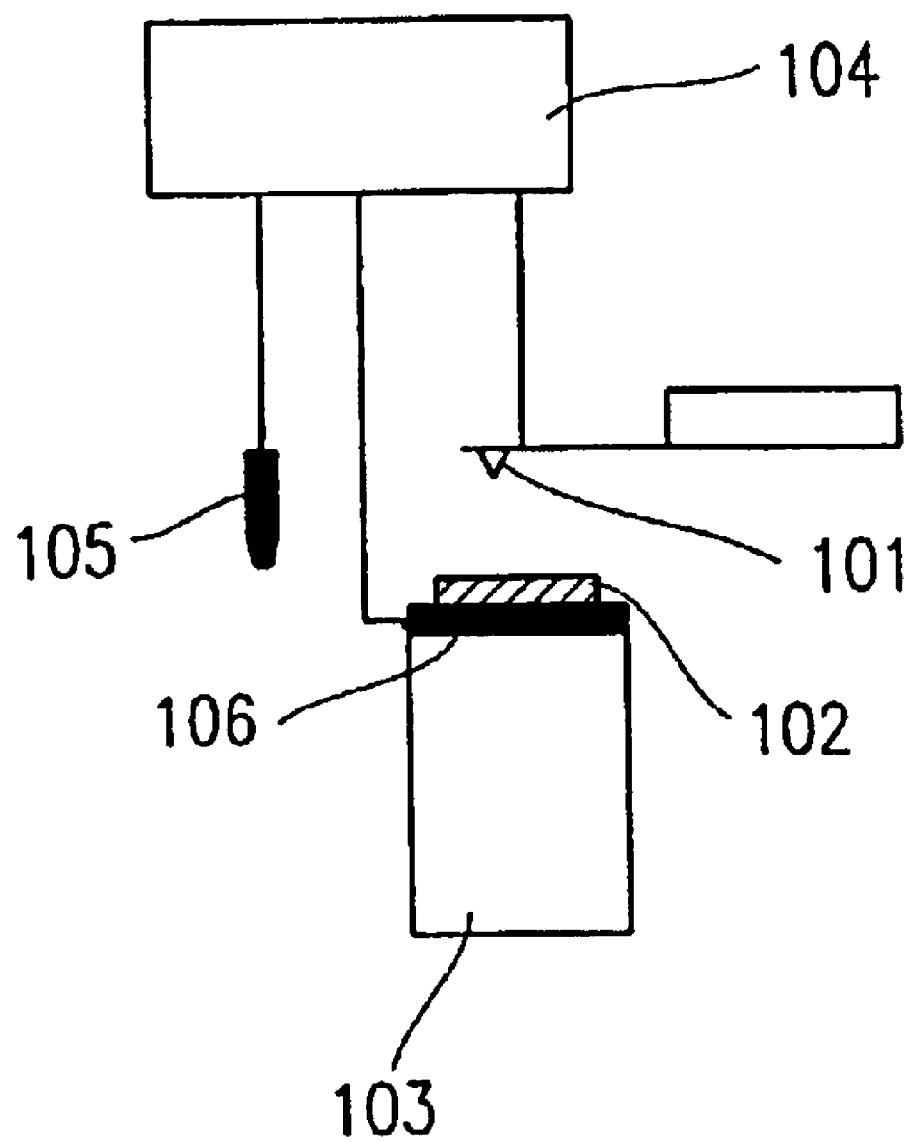
FIG. 10 shows a general configuration of a scanning probe microscope of the present invention. Reference numerals in FIG. 10 denote the following elements: 101: a probe coated with platinum; 102: a sample; 103: piezoelectric element; 104: potentiostat; 105: a reference electrode; 106: counter electrode.
Figure 11:
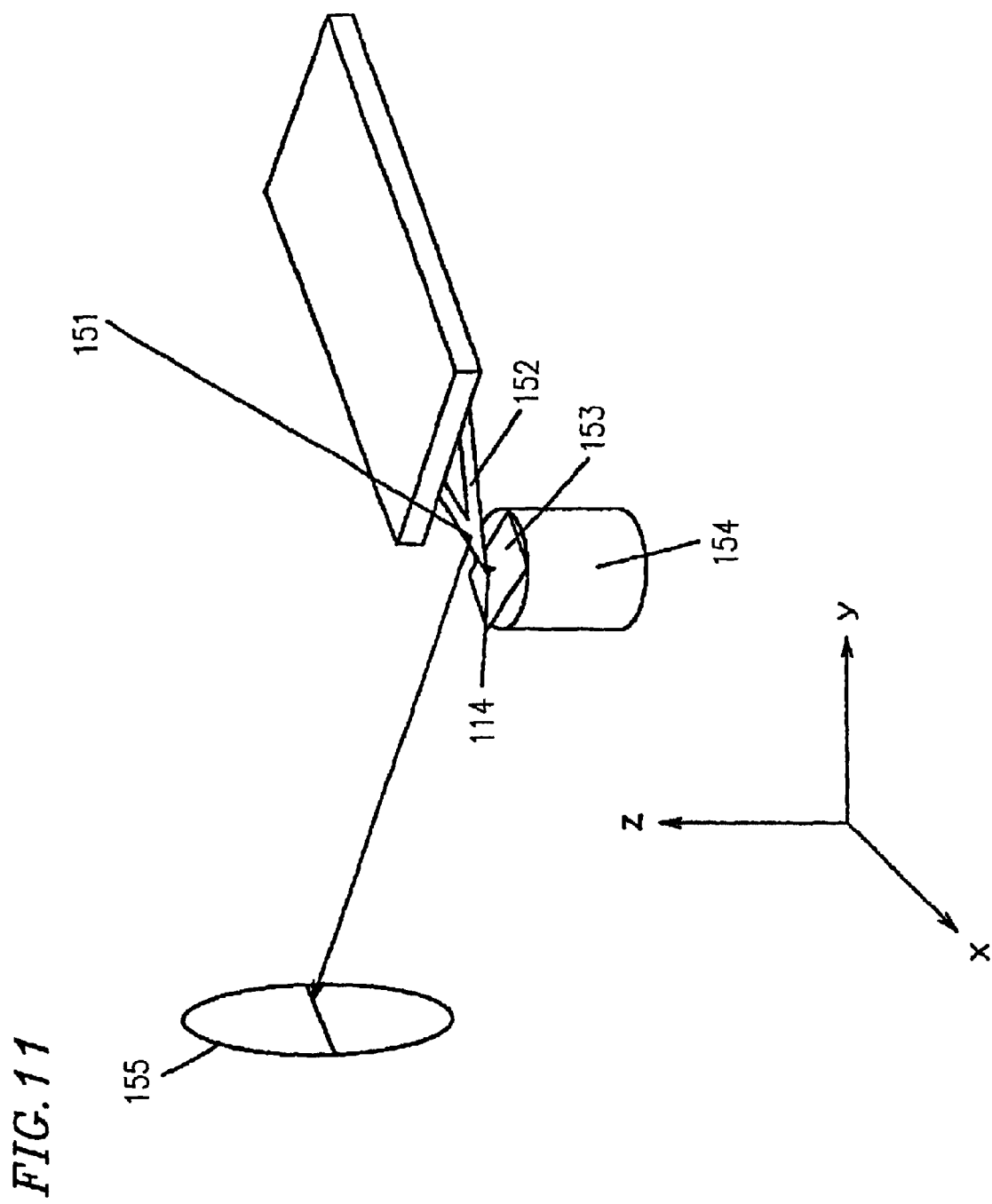
FIG. 11 shows a general configuration of an atomic force microscope. Reference numerals in FIG. 11 denote the following elements: 114: a probe; 151: a laser beam; 152: a lever portion; 153: a sample; 154: a piezoelectric element; 155: two photodiodes.
Figure 12:
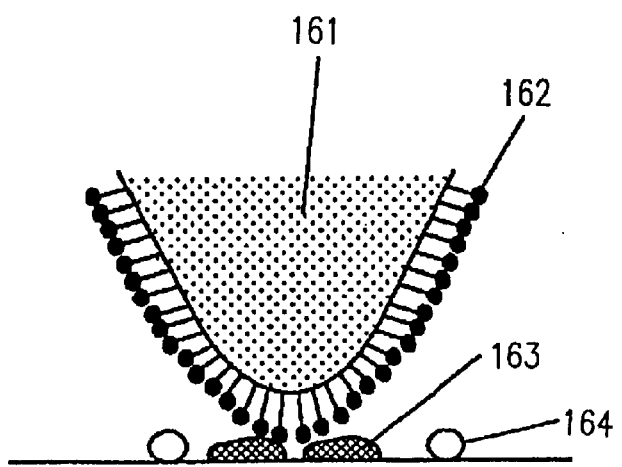
FIG. 12 schematically illustrates measurement of molecules A and B using a conventional intermolecular force microscope. Reference numerals in FIG. 12 denote the following elements: 161: a probe of a scanning probe microscope; 162: a molecule having a chemical sensor function; 163: molecule A: 164: molecule B.
Figure 13:
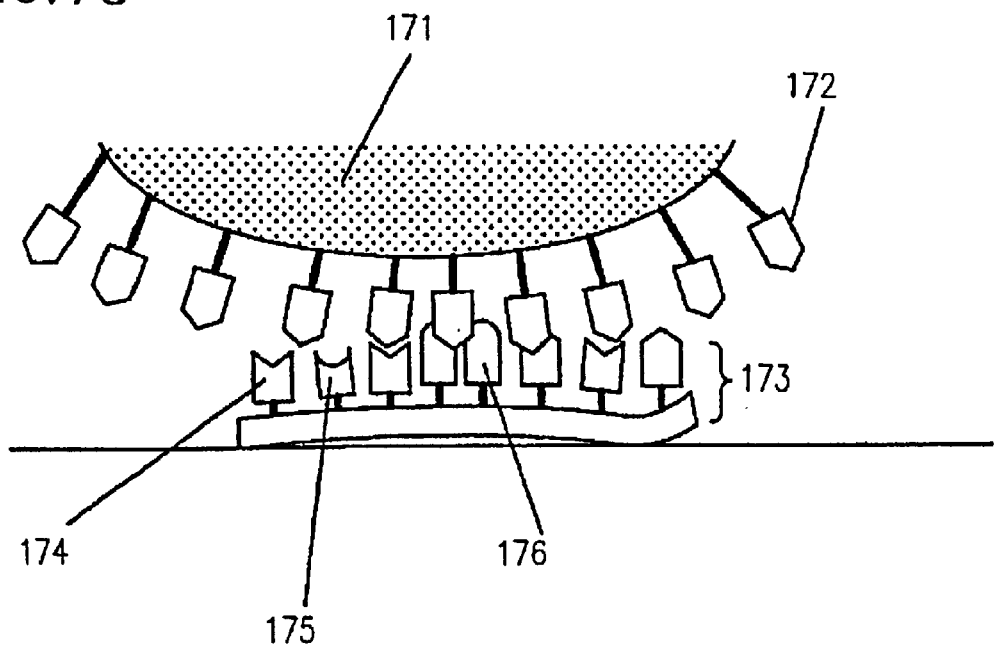
FIG. 13 schematically illustrates the measurement of a single stranded DNA using a conventional intermolecular force microscope. Reference numerals in FIG. 13 denote the following elements: 171: a probe of a scanning probe microscope; 172: thymine; 173: DNA to be measured; 174: adenine; 175: cytosine; 176: guanine.
Figure 14:
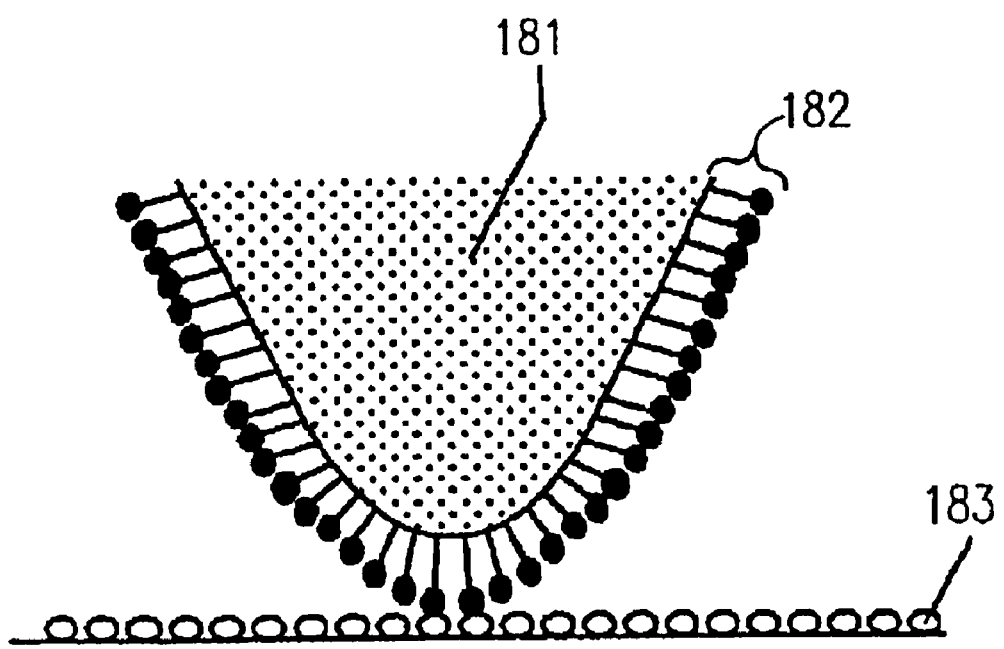
FIG. 14 schematically illustrates the processing of a protein thin film using a conventional intermolecular force microscope. Reference numerals in FIG. 14 denote the following elements: 181: a probe of a scanning probe microscope; 182: a monolayer having a catalytic function; 183: a molecule to be processed.

An electrically conductive probe of an AFM was prepared. This probe can be produced by depositing platinum over a probe which is commonly used in AFMs. The basic structure of a scanning probe microscope used in this example is the same as that of an AMF, except that the probe of this example has an additional function. The additional function is described with reference to FIG. 10. In FIG. 10, a basic control function of the AMF is omitted. A counter electrode 106 and a reference electrode 105 are connected to a probe 101 via a potentiostat device 104. The counter electrode 106 also functions as a sample table. The reference electrode 105 always has a constant voltage value with respect to a solution. Since the potentiostat device 104 can apply to the probe 101 a constant voltage with respect to the reference electrode 105, a voltage which is constant with respect to the solution can be applied to the probe 101. Further, in the potentiostat device 104, the resistance between the probe and the reference electrode is infinite, and an electrochemical current generated on the surface of the probe flows only between the probe and the counter electrode.

The electrically conductive probe 101 of the AFM was immersed in a phosphate buffer solution of pH=7 containing 10 mM of pyrrole and 1 wt % deoxyribonuclease (derived from a bovine pancreas; isoelectric point: pH=5.0). A voltage of 0.7 V (with respect to a standard reference electrode of Ag/AgCl) was applied to the probe 101 for 1 ms, whereby a polypyrrole film containing deoxyribonuclease was formed over the surface of the probe 101.

Next, a single stranded DNA consisting of 100 bases was fixed onto a micaceous plate. Hereinafter, a method for fixing a DNA is described. Cleaved muscovite was exposed to water vapor plasma, whereby a hydroxyl group was introduced into the surface of the muscovite. Thereafter, the micaceous plate was immersed in an ethanol solution containing 1 vol % 3-aminopropyltrimethoxysilane for 1 hour. The micaceous plate was then washed with ethanol and water in this order, and dried for 10 minutes at 100° C. Through this operation, a monolayer containing a molecule whose molecule end is an amino group is formed over the mica. Thereafter, the mica was immersed for 10 minutes in pure water which contains 1 vol % of a single stranded DNA consisting of 100 base pairs. Then, the mica was washed gently with water, and dried at room temperature. In the monolayer over the mica immersed in the neutral aqueous solution, an amino group was electrolytically dissociated so as to be positively charged, and a DNA negatively charged. Thus, the DNA is fixed onto the micaceous plate by the above described method.

The micaceous plate, to which the DNA was fixed, and the probe of the AFM were immersed in a phosphate buffer solution of pH=7, and the single stranded DNA was measured. The measurement was performed while adjusting a piezoelectric element 103 such that the repulsive force between the probe 101 and a sample 102 is kept constant. Then, the position where the DNA existed was identified. Next, at a moment when the probe 101 is present above the DNA, a voltage of 1.0 V was applied to the probe 101 for 1 ns with respect to the reference electrode 105 (at the same time, the probe 101 and the counter electrode 106 are electrically coupled). Thereafter, the DNA was observed again, and it was observed that the DNA was dissected at one position thereof. It is conjectured that such occurred because the application of voltage to the probe 101 caused deoxyribonuclease in the pyrrole to be diffused in the solution, and deoxyribonuclease at the probe tip surface came into contact with the DNA, so that a phosphoric ester bond was hydrolyzed due to a catalytic function. The DNA being dissected at only one position means that only deoxyribonuclease released from the probe tip surface came into contact with the DNA whereas the other deoxyribonuclease was not effective. This is because, if many deoxyribonuclease produced an effect on the DNA, the DNA would be dissected at many positions. In view of such, according to the present invention, a fine molecule processing can be achieved at the level of a molecule.

EXAMPLE 13

A molecule end of a molecule included in a monolayer at a tip of a probe was substituted with an amino group using the same method as that described in example 3, and thereafter, deoxyribonuclease was fixed onto the tip surface of the probe using the same method as that described in example 9. Next, the probe was rotated once around the longitudinal axis thereof, and a molecule end of a molecule included in the monolayer at a site different from the site where deoxyribonuclease had been fixed was substituted with an amino group using the same method as that described in example 3. Then, a phosphate buffer solution of pH=7.4 which contains 10 mM of nucleotide including adenine, into which carboxyl group was introduced, and 10 mM of 1-ethyl-3-(3-dimethylaminopropyl)carbodiimide, was reacted for 1 hour. As a result, a nucleotide including adenine was covalently bonded to a site at the probe tip surface, which is different from the site where deoxyribonuclease had been fixed.

Next, a single stranded DNA consisting of 30 bases was fixed onto a micaceous plate using the same method as that described in example 9. Next, the probe and the micaceous plate were immersed in a buffer solution of pH=7. The surface of the micaceous plate was scanned for measurement in the presence of a deoxyribonuclease inhibitor, while a piezoelectric element was supplied with feedback such that force caused between the probe and the micaceous plate was kept constant. As a result, a position on the micaceous plate where the DNA existed was identified. Then, the probe was moved to a position above the DNA, and the DNA was scanned with the probe at a precision of an atomic scale (precision of 0.1 angstrom), while the distance between the probe and the surface of the plate was adjusted such that the nucleotide including adenine at the probe tip surface is in the closest vicinity of the plate, and such that force caused between the probe and the plate was kept constant. As a result of measurement, protrusions were found at seven positions. These were interpreted as follows. Between adenine fixed onto the probe and thymine in the DNA, force derived from a hydrogen bond is caused. This force is sufficiently larger than that caused between the probe and another base or the plate surface. Thus, when the probe is present above thymine included in the DNA, the probe moves away from the DNA by a large distance in order to keep an interatomic force stable. Therefore, the protrusions, which are not generated in a conventional AFM, were observed on the DNA. Therefore, it was determined that thymine was present at the positions of these protrusions. From the above, the positions of thymine on the DNA were determined by measurement.

Then, the same probe was used to scan the DNA in the same manner as that described above, and scanning was stopped at a site where the third protrusion, i.e., the third thymine was considered to be present. At this site, the tip surface of the probe was rotated once around the longitudinal axis of the probe such that deoxyribonuclease is placed in the closest vicinity of the DNA on the plate, and then, the force curve-was measured. In the force curve measurement, the surface area of the probe which was in contact with the DNA was adjusted so as to be equal to or greater than 1 nm². Under such conditions, the buffer solution was continuously renewed, whereby the inhibitor was removed from the solution. As a result, the DNA was dissected due to a function of deoxyribonuclease. That is, the result of this example proves that the DNA can be freely dissected at an intended position by using a probe of this example.

Since a DNA having an unidentified sequence was fixed onto the plate in this example, after the position of thymine was determined by scanning the DNA, another scanning operation was performed on the DNA for dissection. However, in the case of fixing a DNA having a known sequence on the plate, it is not necessary to perform scanning twice. Dissection of the DNA can be achieved only by a single scanning operation. In this example, a nucleotide including adenine was fixed onto the probe, and accordingly, the position of thymine was identified. Alternatively, in the case where a nucleotide including thymine, guanine, and cytosine is fixed onto the plate, the positions of adenine, cytosine, and guanine can be identified, respectively.

EXAMPLE 14

A polypyrrole film containing deoxyribonuclease was formed over a surface of an electrically conductive probe of an AFM using the same method as that described in Example 12. Next, the probe was immersed for 1 hour in a mixed solution of n-hexadecane and chloroform (volume ratio 4:1) containing 1 vol % of 10-bromodecyltrichlorosilane dissolved therein. Then, the probe was removed from the solution, and washed with chloroform. The above operations were performed in a glove-box filled with dry nitrogen gas. As a result, an organic molecular film having a 10-bromodecyl group was formed over the polypyrrole film on the surface of the probe. Next, the probe was immersed for 12 hours in a solution where 200 mg of $NaN_3$ was dissolved in 25 ml of dimethylformamide, and then washed with dimethylformamide. Through this operation, Br at the molecule end of a molecule contained in the organic molecular film was substituted with $N_3$. Next, the resultant probe was installed in an AFM apparatus, and then, the probe was brought close to a silicon plate, on which platinum was deposited, using a piezoelectric element. This operation was arranged such that both the probe and the silicon plate came into contact with 2-propanol containing hydrogen gas. As a result, the molecule end of a molecule contained in the organic molecular film formed over the polypyrrole film at the probe tip surface was substituted with an amino group due to a catalytic function of platinum. Then, a phosphate buffer solution of pH=7.4 which contains 10 mM of nucleotide including adenine, into which carboxyl group was introduced, and 10 mM of 1-ethyl-3-(3-dimethylaminopropyl)carbodiimide, was reacted for 1 hour. As a result, a nucleotide including guanine was covalently bonded to the organic molecular film formed over the polypyrrole film at the probe tip surface.

Next, a single stranded DNA consisting of 30 bases was fixed onto a micaceous plate using the same method as that described in example 9. Next, the probe and the micaceous plate were immersed in a buffer solution of pH=7.0. The surface of the micaceous plate was scanned for measurement while a piezoelectric element was supplied with feedback such that force caused between the probe and the plate was kept constant. As a result, a position on the micaceous plate where the DNA existed was identified. Then, the same operation as that described in Example 13 was performed, and as a result, 8 positions of cytosine were identified.

Then, the same probe was used to scan the DNA in the same manner as that described above, and scanning was stopped at a site where the fourth cytosine existed. At this site, a voltage of 1.0 V was applied to the probe for 1 ns with respect to the reference electrode. As a result, deoxyribonuclease contained in pyrrole was diffused into the solution, and deoxyribonuclease at the probe tip surface came into contact with the DNA, so that the DNA was dissected. That is, the result of this example proves that the DNA can be freely dissected at an intended position by using a probe of this example.

Since a DNA having an unidentified sequence was fixed onto the plate in this example, after the position of cytosine was determined by scanning the DNA, another scanning operation was performed on the DNA for dissection. However, in the case of fixing a DNA having a known sequence on the plate, it is not necessary to perform scanning twice. Dissection of the DNA can be achieved only by a single scanning operation. In this example, a nucleotide including guanine was fixed onto the probe, and accordingly, the position of cytosine was identified. Alternatively, in the case where a nucleotide including adenine, thymine, and cytosine is fixed onto the plate, the positions of thymine, adenine, and guanine can be identified, respectively.

EXAMPLE 15

Figure 15:
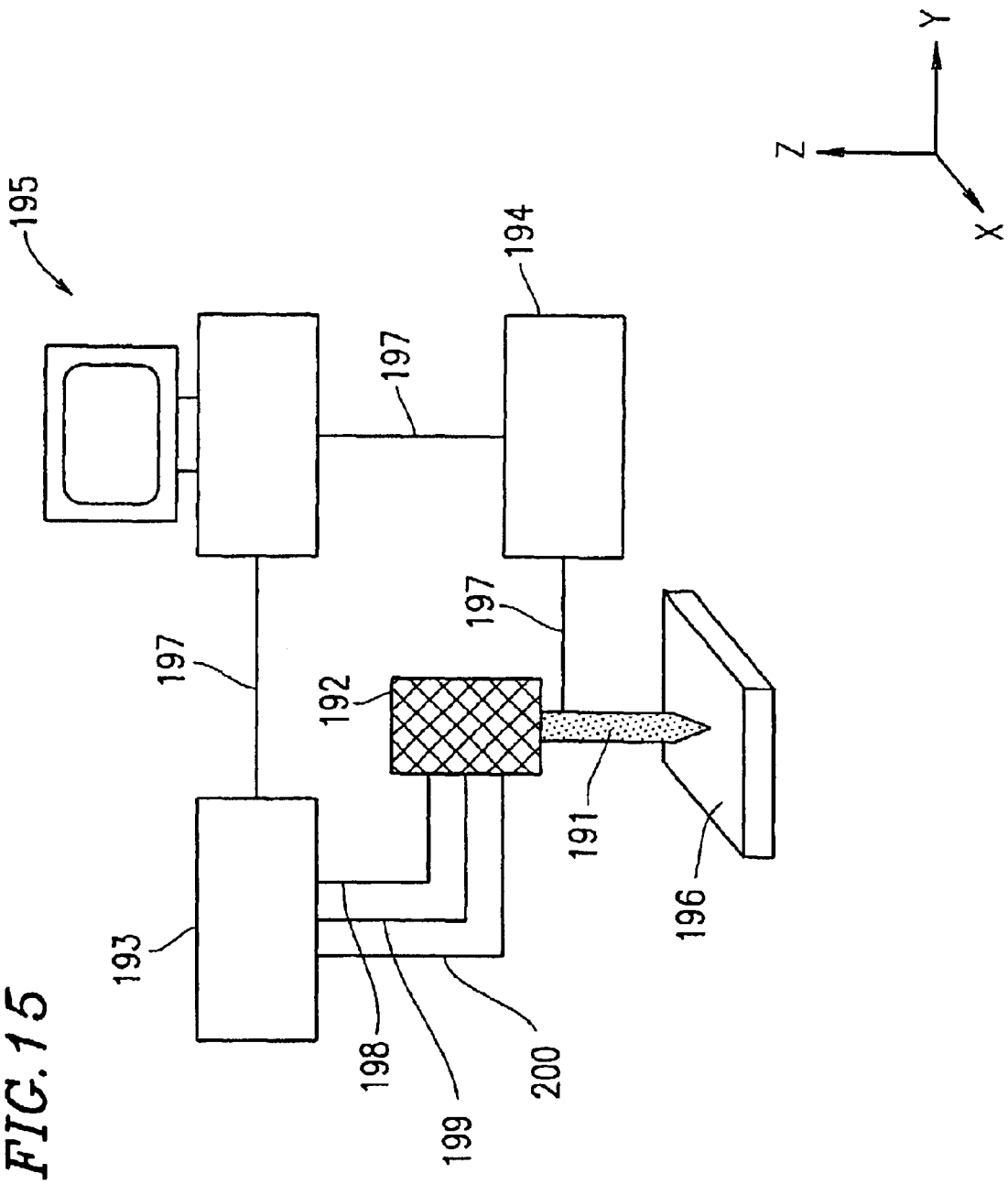
FIG. 15 shows a general configuration of a scanning probe microscope of the present invention. Reference numerals in FIG. 15 denote the following elements: 191: a probe; 192: a piezoelectric element; 193: a signal control device; 194: a signal detection device; 195: a computer; 196: a sample; 197: a signal line; 198: a control signal for controlling extension/retraction of a piezoelectric element in X-axis direction; 199: a control signal for controlling extension/retraction of a piezoelectric element in Y-axis direction; 200: a control signal for controlling extension/retraction of a piezoelectric element in Z-axis direction.

FIG. 15 is a conceptual diagram of a scanning probe microscope of the present invention. This apparatus includes: a probe 191; means (e.g., piezoelectric element) 192 for moving the probe 191 in the three-dimensional directions and thereby controlling the relative positions of the probe 191 and a sample; a signal control device 193 for adjusting the movement of the position control means 192; a signal detection device 194 for detecting an interaction between the probe and the sample; and a computer 195 for processing and controlling the movement of the position control means 192 and data of the interaction between the probe and the sample. The probe 191 has a sensor molecule or catalyst molecule described above. Although other unshown apparatuses are additionally required in order to detect a interaction between the probe and the sample, such apparatuses are herein omitted. Examples of the interaction to be measured include force which is caused between the probe and the sample (interatomic force, intermolecular force, electrostatic force, magnetic force, etc.), a tunneling current which flows between the probe and the sample, an evanescent field generated between the probe and the sample, etc. Among these examples, force caused between the probe and the sample is measured in general cases. Further, in the structure of this example, the sample is fixed while the probe is moved by the piezoelectric element. Conversely, the apparatus may be structured such that the sample is moved by the piezoelectric element, while the probe is fixed.

By measuring an interaction caused between the probe and the sample while measuring a certain region over the X-Y plane in a state where the probe 191 is placed in the vicinity of the sample, information over the surface of the sample can be examined. Further, the probe 191 is moved to any region over the surface of the sample 196, and the surface of the sample 196 can be processed with the probe 191. For example, a sensor molecule which strongly interacts only with a specific molecule is fixed to the probe 191, and force caused between the probe 191 and the sample 196 is measured, whereby the position of the specific molecule on the surface of the sample 196 can be identified. Alternatively, a molecule having a catalytic function is bonded to the probe 191, and the probe 191 is placed in the vicinity of the surface of the sample, whereby a specific molecule present on the surface of the sample can be processed. Alternatively, for example, an electrically conductive polymer layer containing a catalyst molecule is formed over a surface of a probe 191, and the probe 191 is placed in the vicinity of a surface of a sample. Then, a predetermined voltage is applied to the probe 191 such that the catalyst molecule is released onto the surface of the sample, whereby the surface of the sample can be processed.

In the above described embodiments of the present invention, a chlorosilane-based monolayer is used as an organic monolayer. However, the present invention is not limited thereto. As a matter of course, a monolayer including a molecule whose molecule end is an alkoxyl group or a thiol group can be used. Furthermore, an enzyme is basically fixed to an organic monolayer, but the present invention is not limited thereto. As a matter of course, a base used for determining a base sequence of a DNA, a molecule used for determining a specific functional group of a molecule, and an antigen and antibody used for determining the positions of an antigen and antibody, etc., can be fixed to the probe.

INDUSTRIAL APPLICABILITY

As described above, the present invention provides: a probe to which a molecule having a sensor function or catalytic function is fixed only at a probe tip surface; and a production method of such a probe. Further, the present invention provides: a probe which is capable, in principle, of processing a single molecule even when the probe tip surface is not sharp at an atomic level; and a production method of such a probe. Use of a probe of the present invention is not limited to analysis or processing of a molecule. The probe of the present invention can be used for analyzing/processing various cells or tissues of organisms; for example, identification of a protein position within a cell membrane, identification of an ion channel, injection of a specific DNA into a cell, etc.

What is claimed is:

1. A probe for a scanning probe microscope, comprising: a proximal end; and a distal tip portion,
   wherein the distal tip portion has a tip surface which faces a fixed sample, and
   at least one monolayer is formed at least on the tip surface, and a molecule having a chemical sensor function or catalytic function is placed in or on a portion of an outermost monolayer above the tip surface,
   wherein: a plurality of monolayers are formed over the tip surface; and the molecular density in respective layers of the plurality of monolayers decreasingly varies from the tip surface to the outermost layer.

2. A probe according to claim 1, wherein the at least one monolayer is formed by use of a covalent bond.

3. A probe according to claim 1, wherein: the at least one monolayer is formed of an organic molecule; and the number of molecules included in an outermost monolayer above the tip surface is equal to or smaller than 100.

4. A probe for a scanning probe microscope, comprising: a proximal end; and a distal tip portion,
   wherein the distal tip portion has a tip surface which faces a fixed sample, and
   at least one monolayer is formed at least on the tip surface, and a molecule having a chemical sensor function or catalytic function is placed in or on a portion of an outermost monolayer above the tip surface,
   wherein: the probe includes stacked monolayers; a plurality of molecules having a chemical sensor function or catalytic function are provided in different monolayers; and the plurality of molecules have different chemical sensor functions or catalytic functions.

5. A probe for a scanning probe microscope, comprising: a cover layer containing an electrically conductive polymer; and a catalyst in the cover layer, the catalyst being selected from a group consisting of inorganic catalysts and organic catalysts.

6. A probe according to claim 5, further comprising at least one organic molecular film formed on the cover layer, wherein a molecule having a chemical sensor function or catalytic function is placed in or on an outermost organic molecular layer.

7. A probe according to claim 6, wherein a function of the catalyst contained in the cover layer is different from a function of the molecule having the chemical sensor function or catalytic function.

8. A method for producing the probe for a scanning probe microscope recited in claim 1, comprising steps of:
   (a) forming a monolayer on a probe; and
   (b) forming another monolayer on the monolayer, or modifying a molecular structure of a molecule included in the monolayer, wherein the step (b) includes: substituting a molecule end of a molecule included in the monolayer with a functional group by means of a chemical reaction performed at a substitution efficiency of smaller than 1; and bonding the functional group to a molecule which is capable of being bonded to the functional group.

9. A method for producing the probe for a scanning probe microscope, the probe comprising:

a proximal end; and a distal tip portion, wherein the distal tip portion has a tip surface which faces a fixed sample, and at least one monolayer is formed at least on the tip surface, and a molecule having a chemical sensor function or catalytic function is placed in or on a portion of an outermost monolayer above the tip surface, and the method comprising the steps of:
 (a) forming a monolayer formed of an organic molecule on a probe; and
 (b) bringing the distal tip portion of the probe into contact with a surface of a solid substance having a catalytic function, so that only the organic molecule at a tip surface of the distal tip portion of the probe is reactively modified.

10. A method for producing the probe for a scanning probe microscope, the probe comprising:

a proximal end; and a distal tip portion, wherein the distal tip portion has a tip surface which faces a fixed sample, and at least one monolayer is formed at least on the tip surface, and a molecule having a chemical sensor function or catalytic function is placed in or on a portion of an outermost monolayer above the tip surface, and the method comprising the steps of:
 (a) forming a monolayer formed of an organic molecule on a probe, wherein the monolayer is formed of an organic molecule; and
 (b) scanning with the probe a surface of a solid substance including at least one region which has a catalytic function, and reactively modifying only the organic molecule at the tip surface of the distal tip portion of the probe.

11. A method according to claim 9, wherein a molecular structure of the organic molecule is modified by a chemical reaction, when the organic molecule comes into contact with a solid catalyst in the presence of a substrate; and the step (b) includes repeating reciprocation of the probe by moving the probe toward, and away from, a surface of the solid catalyst in the absence of the substrate, thereby adjusting an approach distance between the probe and the solid catalyst, and thereafter positioning the probe and the solid catalyst with the approach distance there between in the presence of the substrate, thereby modifying a molecular structure of the organic molecule.

12. A method according to claim 9, further comprising a step of bonding an organic molecule having a chemical sensor function or catalytic function to the modified organic molecule.

13. A method for producing the probe for a scanning probe microscope recited in claim 5, comprising steps of:
 immersing a probe in a solution containing an electrochemically-polymerizable monomer; and
 applying a voltage to the probe so as to polymerize the monomer, thereby forming a cover layer.

14. A method according to claim 13, wherein the monomer solution includes a catalyst molecule.

15. A method according to claim 13, further comprising steps of: immersing a probe having the cover layer in a solution or dispersion solution containing a catalyst molecule; and applying a voltage to the probe, thereby uptaking the catalyst molecule in the cover layer.

16. A method for processing an intended molecule using a scanning probe microscope having a probe, the probe having a cover layer containing an electrically conductive polymer, and a catalyst molecule being uptaken in the cover layer, the method comprising steps of:
 moving the probe closer to the intended molecule; and
 applying a voltage to the electrically conductive polymer so as to release the catalyst molecule to the intended molecule, thereby causing a chemical reaction.

17. A scanning probe microscope, comprising:
 the probe recited in claim 1;
 means for controlling relative positions of the probe and the sample: and
 means for detecting an interaction between the probe and the sample.

18. A method according to claim 10, further comprising a step of bonding an organic molecule having a chemical sensor function or catalytic function to the modified organic molecule.

* * * * *